United States Patent
Lee et al.

(10) Patent No.: US 11,629,873 B2
(45) Date of Patent: Apr. 18, 2023

(54) AIR PURIFYING SYSTEM AND METHOD FOR CONTROLLING THE AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: David Kangseong Lee, Seoul (KR); Haeyoong Chung, Seoul (KR); Jongkeon Jeon, Seoul (KR); Jiyoung Kang, Seoul (KR); Daeyoung Kwak, Seoul (KR); Sohee Park, Seoul (KR)

(73) Assignees: LG ELECTRONICS INC., Seoul (KR); Chungang University Industry Academic Cooperation Foundation, Seoul (KR)

( * ) Notice: Subject to any disclaimer, the term of this patent is extended or adjusted under 35 U.S.C. 154(b) by 531 days.

(21) Appl. No.: 16/821,087

(22) Filed: Mar. 17, 2020

(65) Prior Publication Data
US 2020/0298168 A1  Sep. 24, 2020

(30) Foreign Application Priority Data

Mar. 19, 2019  (KR) ........................ 10-2019-0031462
Jul. 29, 2019  (KR) ........................ 10-2019-0091557

(51) Int. Cl.
*B01D 46/00* (2022.01)
*B01D 46/42* (2006.01)
(Continued)

(52) U.S. Cl.
CPC .................................. *F24F 8/80* (2021.01); *A47L 5/24* (2013.01); *A47L 9/122* (2013.01); *A47L 9/2805* (2013.01);
(Continued)

(58) Field of Classification Search
CPC .............. B01D 46/442; B01D 46/0043; B01D 46/4227; B01D 46/46; B01D 2273/30;
(Continued)

(56) References Cited

U.S. PATENT DOCUMENTS 4,832,716 A * 5/1989 McMichael ............. F24F 3/163
                                                    55/467
5,524,321 A    6/1996 Weaver et al.
(Continued)

FOREIGN PATENT DOCUMENTS

CA    2 087 056    7/1994
CN    2124670    12/1992
(Continued)

OTHER PUBLICATIONS

European Search Report dated Aug. 20, 2020 issued in Application No. 20161002.9.
(Continued)

*Primary Examiner* — Minh Chau T Pham
(74) *Attorney, Agent, or Firm* — KED & Associates LLP

(57) ABSTRACT

An air purifying system may include a main air purifier placed in an indoor space, a handheld air purifier mounted on the main air purifier, and an air quality sensor IOT device that communicates with the main air purifier. The air quality sensor IOT device may be fixed in an outdoor space adjacent to the indoor space, or may be carried by a user to measure air quality data while the user travels. The main air purifier may automatically operate based on air quality data received from the air quality sensor IOT device.

19 Claims, 15 Drawing Sheets

(51) Int. Cl.
  *B01D 46/44* (2006.01)
  *B01D 46/46* (2006.01)
  *F24F 11/56* (2018.01)
  *F24F 11/58* (2018.01)
  *F24F 8/80* (2021.01)
  *A47L 5/24* (2006.01)
  *A47L 9/12* (2006.01)
  *A47L 9/28* (2006.01)
  *A47L 9/32* (2006.01)
  *F24F 8/10* (2021.01)

(52) U.S. Cl.
  CPC .......... *A47L 9/322* (2013.01); *B01D 46/009* (2013.01); *B01D 46/0043* (2013.01); *B01D 46/4227* (2013.01); *B01D 46/442* (2013.01); *B01D 46/46* (2013.01); *F24F 8/10* (2021.01); *B01D 2273/30* (2013.01)

(58) Field of Classification Search
  CPC .......... A47L 5/24; A47L 9/2805; A47L 9/322; F24F 8/10; F24F 11/64; F24F 11/56; F24F 11/58; F24F 13/28; F24F 13/32; F24F 2110/50
  USPC .......... 55/385.2, 472, 473, DIG. 34; 96/424, 96/397, 417, 422; 95/25, 26
  See application file for complete search history.

(56) References Cited

U.S. PATENT DOCUMENTS

| | | | |
|---|---|---|---|
| 5,803,940 | A | 9/1998 | Rick |
| 6,660,070 | B2 * | 12/2003 | Chung ............... B01D 46/442 96/417 |
| 8,302,251 | B2 | 11/2012 | Beskow et al. |
| 10,323,855 | B2 * | 6/2019 | Jung ............... B01D 46/2403 |
| 10,563,667 | B2 * | 2/2020 | Park ............... F24F 13/10 |
| 10,695,706 | B2 * | 6/2020 | Cho ............... B01D 46/46 |
| 10,697,665 | B2 * | 6/2020 | Jung ............... F24F 8/108 |
| 2004/0200007 | A1 | 10/2004 | Heim |
| 2007/0221061 | A1 | 9/2007 | Steiner |
| 2008/0300154 | A1 * | 12/2008 | Duchesne ............ C10M 159/24 508/149 |
| 2009/0007368 | A1 | 1/2009 | Oh |
| 2009/0248208 | A1 * | 10/2009 | Fukushima .......... F24F 1/0068 62/317 |
| 2010/0242209 | A1 | 9/2010 | Beskow et al. |
| 2011/0083757 | A1 | 4/2011 | Shore |
| 2011/0083767 | A1 | 4/2011 | Johnson |
| 2018/0211168 | A1 * | 7/2018 | Khurshudov .......... G06N 5/025 |
| 2019/0274509 | A1 | 9/2019 | Moyher, Jr. et al. |
| 2022/0061621 | A1 * | 3/2022 | Weyant ............... G05D 1/0221 |
| 2022/0142435 | A1 | 5/2022 | Moyher, Jr. et al. |

FOREIGN PATENT DOCUMENTS

| | | |
|---|---|---|
| CN | 1091183 | 8/1994 |
| CN | 1636494 | 7/2005 |
| CN | 1718272 | 1/2006 |
| CN | 1922352 | 2/2007 |
| CN | 101182674 | 5/2008 |
| CN | 201337394 | 11/2009 |
| CN | 201482748 | 5/2010 |
| CN | 201615550 | 10/2010 |
| CN | 201624612 | 11/2010 |
| CN | 103479296 | 1/2014 |
| CN | 103582442 | 2/2014 |
| CN | 203852751 | 10/2014 |
| CN | 104159384 | 11/2014 |
| CN | 104832996 | 8/2015 |
| CN | 105202646 | 12/2015 |
| CN | 105465918 | 4/2016 |
| CN | 105674417 | 6/2016 |
| CN | 105 962 842 | 9/2016 |
| CN | 106466173 | 3/2017 |
| CN | 206138051 | 5/2017 |
| CN | 106958873 | 7/2017 |
| CN | 206347659 | 7/2017 |
| CN | 107019483 | 8/2017 |
| CN | 107110530 | 8/2017 |
| CN | 207821786 | 9/2018 |
| CN | 108937823 | 12/2018 |
| CN | 109247770 | 1/2019 |
| CN | 208355430 | 1/2019 |
| CN | 109442619 | 3/2019 |
| CN | 110857807 | 3/2020 |
| CN | 111473459 | 7/2020 |
| CN | 111720915 | 9/2020 |
| DE | 10-2017-206356 | 10/2018 |
| EP | 3211338 | 8/2017 |
| EP | 3237809 | 11/2017 |
| JP | 08-187660 | 7/1996 |
| JP | H08-187660 | 7/1996 |
| JP | 11-267416 | 10/1999 |
| JP | H11-267416 | 10/1999 |
| JP | 2002-292226 | 10/2002 |
| JP | 3129636 | 3/2007 |
| JP | 2017-40448 | 2/2017 |
| KR | 10-2006-0089191 | 8/2006 |
| KR | 10-2016-0147301 | 12/2016 |
| KR | 10-2017-0019895 | 2/2017 |
| KR | 10-2018-0052794 | 5/2018 |

OTHER PUBLICATIONS

Chinese Notice of Allowance dated Apr. 13, 2022 issued in Application No. 202010190698.3.
U.S. Office Action dated Jul. 11, 2022 issued in U.S. Appl. No. 16/821,197.
United States Office Action dated Nov. 18, 2022 issued in co-pending related U.S. Appl. No. 16/821,124.
Chinese Office Action issued in Application No. 202010190698.3 dated Mar. 22, 2021.
Chinese Office Action issued in Application No. 202010191311.6 dated Mar. 24, 2021.
Chinese Office Action dated Sep. 10, 2021 issued in Application No. 202010190698.3.
Chinese Office Action dated May 21, 2021 issued in CN Application No. 202010118682.1.
European Search Report dated Aug. 14, 2020 issued in Application No. 20160997.1.
Chinese Notice of Allowance dated Apr. 13, 2022 issued in CN Application No. 202010190698.3.
Chinese Notice of Allowance dated Apr. 20, 2022 issued in Application No. 202010191311.6.
U.S. Appl. No. 16/821,087, filed Mar. 17, 2020.
U.S. Appl. No. 16/821,124, filed Mar. 17, 2020.
U.S. Appl. No. 16/821,197, filed Mar. 17, 2020.
Chinese Office Action issued in Application No. 202010191311.6 dated Jan. 13, 2022.
European Search Report dated Aug. 20, 2020 issued in Application No. 20160853.6.

* cited by examiner

AIR PURIFYING SYSTEM AND METHOD FOR CONTROLLING THE AIR PURIFYING SYSTEM

CROSS-REFERENCE TO RELATED APPLICATION(S)

This application claims priority under 35 U.S.C. § 119 to Korean Application Nos. 10-2019-0031462 filed on Mar. 19, 2019 and 10-2019-0091557 filed on Jul. 29, 2019, whose entire disclosure(s) is/are hereby incorporated by reference.

BACKGROUND

1. Field

The present disclosure relates to an air purifying system and a method of controlling the air purifying system.

2. Background

An air cleaner or purifier may be a device or apparatus which suctions contaminated air, purifies the suctioned contaminated air, and then discharges purified air. The air cleaner may include a fan to suction outside or ambient air into an interior of the air cleaner and a filter to filter pollutants or contaminants including dust, germs, etc. in the suctioned air. Generally, an air purifier is configured to purify an indoor space such as a home or office.

Many outside pollutants may be brought indoors by attaching to clothes. Clothing and/or hair treatment devices such as stylers may incidentally remove pollutants from clothes. KR 10-2006-0089191 discloses a multifunctional dryer with ultra-high speed hair, hand, and body drying and dust removal (alternatively called an "air wash.") The above-described multifunctional dryer is installed at a wall and blows air through an opening toward a body and clothes. Foreign matter and dust may be blown away from the clothes by the air flow and scattered into the room, further polluting the indoor air.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
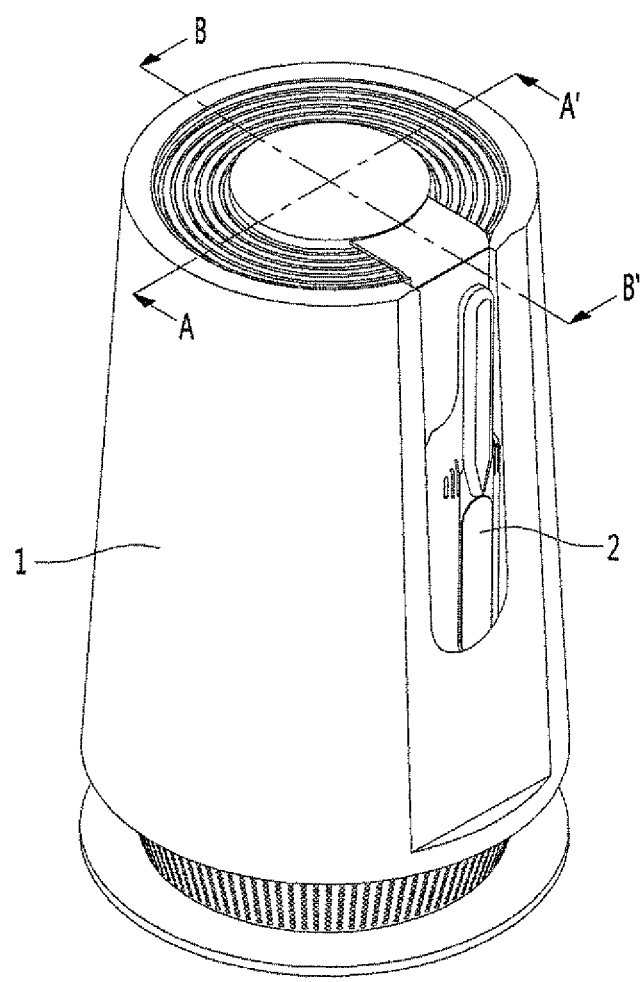
FIG. 1 is a perspective view of an air cleaning system according to an embodiment.

Referring to FIG. 1, an air cleaning, filtering, or purifying system may include a main air purifier or cleaner 1 capable of purifying a large volume of air and a handheld air purifier 2 capable purifying a small volume of air. The handheld air purifier 2 may be docked or mounted on the main air purifier 1, and may be removed or separated from the main air purifier 1. An air cleaning capacity of the main air purifier 1 may be larger than an air cleaning capacity of the handheld air purifier 2. The main air purifier 1 and the handheld air purifier 2 may alternatively be referred to as a first air purifier and a second air purifier, respectively. The handheld air purifier 2 may alternatively be referred to as a cleaner or a handheld vacuum.

While the main air purifier 1 may remain in a fixed position, the handheld air purifier 2 may be easily held by a user and moved to target specific objects to be cleaned. The handheld air purifier 2 may also be referred to as a moveable, mobile, or portable air purifier or a dust vacuum. The main air purifier 1 may weigh more and may be more difficult to handle than the handheld air purifier 2, but the main air purifier 1 may still be carried and moved or adjusted. Alternatively, the main air purifier 1 may be fixed to a wall or a floor.

The main air purifier 1 may have a relatively large cleaning capacity and the handheld air purifier 2 may have a relatively small cleaning capacity, where cleaning capacity here means a maximum cleaning capacity per unit time. Air cleaning or purifying capacities may be measured by cubic feet of air per minute or CFM.

The main air purifier 1 and the handheld air purifier 2 may each include fans or blowers (35 in FIGS. 3 and 160 in FIG. 4) to suction air. The main and handheld air purifiers 1 and 2 may be configured such that, if the fan inside the handheld air purifier 2 is rotated at a maximum speed and the fan inside the main air purifier 1 is rotated at a minimum speed, a current cleaning capacity or CFM of the handheld air purifier 2 may be equal to or larger than a current cleaning capacity or CFM of the main air purifier 1. Alternatively, in such a case, the current cleaning capacity of the handheld air purifier 1 may still be less than the current cleaning capacity of the main air purifier 1.

The main air purifier 1 may be strategically placed to keep an entire indoor living space more clean. For example, the main air purifier 1 may be placed in a frequently traveled indoor space (e.g., hallway, foyer, family room), a central indoor space (e.g., a family room, living room, foyer, or hallway), a particularly dirty place (e.g., kitchen or near a door leading outside), or a space exposed to clothing or shoes (e.g., a closet or foyer). Placement of the main air purifier 1 is not limited to the above-described rooms.

The handheld air purifier 2 may be hand-held and portable by a user so that the user may target a specific object, surface, or area. The handheld air purifier 2 may be configured to remove dust from clothes or other objects. The handheld air purifier 2 may suction air at a surface of clothes to filter out foreign substances and then discharge purified air. The handheld air purifier 2 may optionally include a motor, a HEPA filter, and a dust bin to collect dust suctioned into the handheld air purifier 2. The handheld air purifier 2 may optionally include a removable nozzle or hose.

The main air purifier 1 may operate independently from the handheld air purifier 2 when the handheld air purifier 2 is mounted on the main air purifier 1. The handheld air purifier 2 may be mounted on an outer wall or surface rather than inside of the main air purifier 1. By mounting the handheld air purifier 2 on the outer surface of the main air purifier 1, the user may conveniently pick up and use the handheld air purifier 2.

The handheld air purifier 2 may not operate while mounted on the main air purifier 1 to save power consumption, although a user may control the handheld air purifier 2 to operate regardless of a position or mounting status of the handheld air purifier 2. The handheld air purifier 2 may communicate with the main air purifier 1 via, e.g., a wired communication while mounted or a wireless communication like BlueTooth or WiFi regardless of mounting status. The handheld air purifier 2 may be charged when mounted on the main air purifier 1 via a wired connection or via a wireless power transfer (WPT) method (e.g., electromagnetic induction method). As an example, each of the main and handheld air purifiers 1 and 2 may have a battery and at least one of a wireless power transceiver, receiver, or transmitter. The main air purifier 1 may be configured to connect to a commercial or external power supply (e.g., wall socket).

Figure 2:
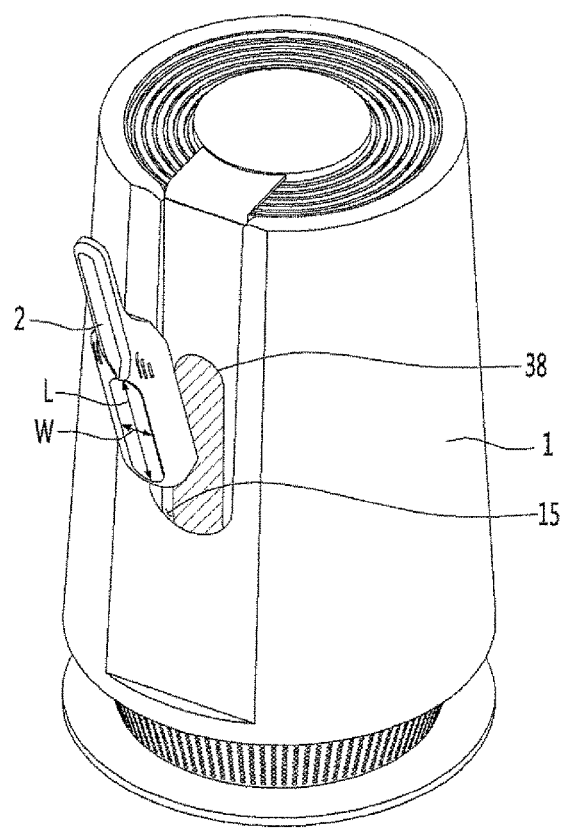
FIG. 2 is a view showing a handheld air purifier separated from a main air purifier.
Figure 3:
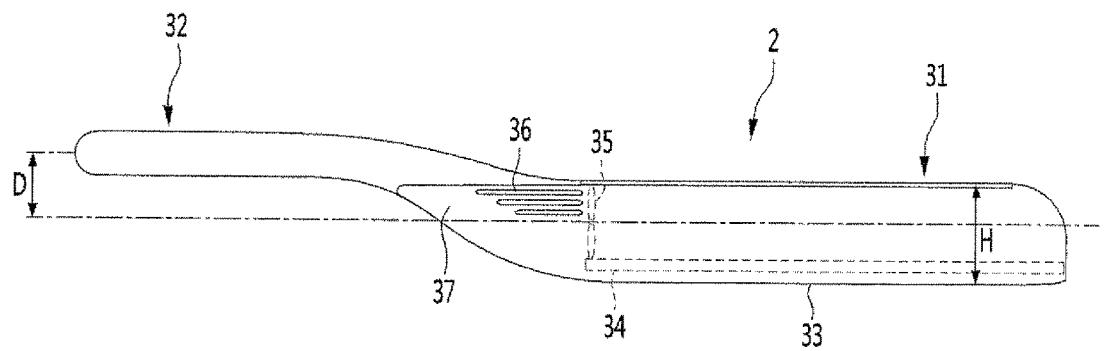
FIG. 3 is a side view of the handheld air purifier.

Referring to FIGS. 2 and 3, a portion of the outer surface of the main air purifier 1 may be a mounting portion 15. The mounting portion 15 may be recessed inward from the outer surface of the main air purifier 1 to support a front face of the handheld air purifier 2. The handheld air purifier 2 may be inserted into the mounting portion 15 to be supported, or alternatively the handheld air purifier 2 may hang from an edge of the mounting portion 15.

The mounting portion 15 may be not completely circular and may have shapes similar to an oval, elliptical, or stadium (i.e., rectangular with semicircular ends). As viewed from an interior of the main air purifier 1, the mounting portion 15 may be an inclined or curved surface that serves as an air guide structure. Alternatively, the mounting portion 15 may not protrude too far into an interior of the main air purifier 1 so as not to interfere with the air flow.

The mounting portion 15 may include a light 38 provided at a position where the handheld air purifier 2 is placed during mounting. The light 38 may include a light or position sensor to sense when handheld air purifier 2 is mounted or detached. In addition, the light 38 may include a sensor to sense an amount of light present in the room where the main air purifier 1 is placed, and may turn on automatically to emit light when the handheld air purifier 2 is detached and the room is relatively dark (i.e., a light level is measured to be less than or equal to a predetermined light level). The light 38 may optionally include an ultraviolet light device (e.g., ultraviolet light emitting diode or LED) configured to sterilize the handheld air purifier 2 once the handheld air purifier 2 is mounted.

The handheld air purifier 2 may include a suction body 31 formed to be long in a first direction (i.e., a longitudinal direction) and a handle 32 extended in the first direction from the suction body 31. The handle 32 may be sized and shaped to be easily gripped by a user's hand.

The suction body 31 may have a long bar shape in the first direction. A front surface of the suction body 31 may have a suction surface 33 provided in a flat two-dimensional planar structure. A filter 34 may be fixed to an inner or rear side of the suction surface 33 so that foreign matter can be filtered out from air suctioned through the suction surface 33. The filter 34 may be a HEPA filter, carbon filter, cardboard filter, strainer, etc. The suction surface 33 may include at least one hole or opening through which air may enter an inside of the handheld air purifier 2. A size and shape of the filter 34 may correspond to a size and shape of the suction surface 33.

A bending or connection portion 37 bend or curve between the suction body 31 and the handle 32. A side of the bending portion 37 coupled to the suction body 31 may be provided further in a second direction than a side of the bending portion 37 coupled to the handle 32, where the second direction is a direction perpendicular to the first direction. For convenience of description, the second direction will be referred to as a vertical direction with respect to an orientation illustrated in FIG. 3, but one of ordinary skill in the art will understand that a user is not limited to using the handheld air purifier 2 in the orientation shown in FIG. 3.

With reference to FIG. 3, the handle 32 may be positioned above the suction body 31. When the suction surface 33 is applied to a surface to be clean (e.g., clothes), the handle 32 may not contact the surface. The user may not need to press the handle 32 downward excessively toward the surface, reducing the possibility of contaminants touching a hand gripping the handle 32. A central axis of the handle 32 in the first direction may be provided above a central axis of the suction member 31 in the first direction by a distance D.

At least one of the bending portion 37 and the suction body 31 may be provided with a discharge port 36 through which clean air filtered by the filter 34 may be discharged. The discharge port 36 may be provided at rear (i.e., upper) and/or side surfaces of the suction body 31 and/or the bending portion 37, and may include at least one hole or opening through which air from inside the handheld air purifier 2 is discharged. As an example, the discharge port 36 may have openings on left and right sides of the bending portion 37. Alternatively, the discharge port 36 may be provided on the handle 32.

A position of the discharge port 36 may be configured so that air discharged from the discharge port 36 may be prevented from reaching clothes, which the suction surface 33 may face, to prevent scattering of dust still on the clothes. An overall pollution of an indoor environment may be reduced by limiting an amount of air that is blown directly toward the clothes and instead suctioning air near clothes through the filter 34.

A fan 35 may be provided inside the suction body 31 at a position in the first direction between the discharge port 36 and a majority of the filter 34. As shown in FIG. 3, the fan 35 may be provided at an end of the filter 34 closest to the discharge port 36, and an axis of the fan 35 around which blades rotate may extend in the first direction. However, the orientation and position of the fan 35, discharge port 36, and filter 34 is not limited to those shown in FIG. 3. For example, the discharge port 36 may be provided at a rear of the suction body 31, the filter 34 may be provided behind the front of the suction body 31 such that the discharge port 36 faces the filter 34, and the fan 35 may be provided between the filter 34 and the discharge port 36 and oriented to face the filter 34 such that the axis of the fan 35 extends in the vertical direction.

The fan 35 may create a negative pressure to suction air through the suction surface 33 and through the filter 34 to remove foreign matter like dust from a surface to which the suction surface 33 is applied. The suction body 31 may have a shape configured to easily suck foreign matter attached to clothes. A height H of the suction body 31 in the second direction may be less than a width of the suction body in a third direction that is perpendicular to the first and second directions. The width may be less than a length of the suction body 31 in the first (i.e., longitudinal) direction. The width may be a distance between side surfaces of the suction body 31.

The length of the suction body 31 may be longer than a length of the handle 32. Dust may be removed from a large surface area by holding the handle 31 and waving the handle 31 across the surface to left and right sides. Since the width of the suction body 31 may be larger than the height H, dust may be suctioned from a particular area for a longer time. The height H of the suction body 31 may help to form or define a passage of air flow, and the height H of the suction body 31 may be minimized when the fan 35 has the orientation and position shown in FIG. 3 (i.e., between an end of the filter 34 provided behind the suction surface 33 and the discharge port 36 provided at sides of the bending portion 37).

Figure 4:
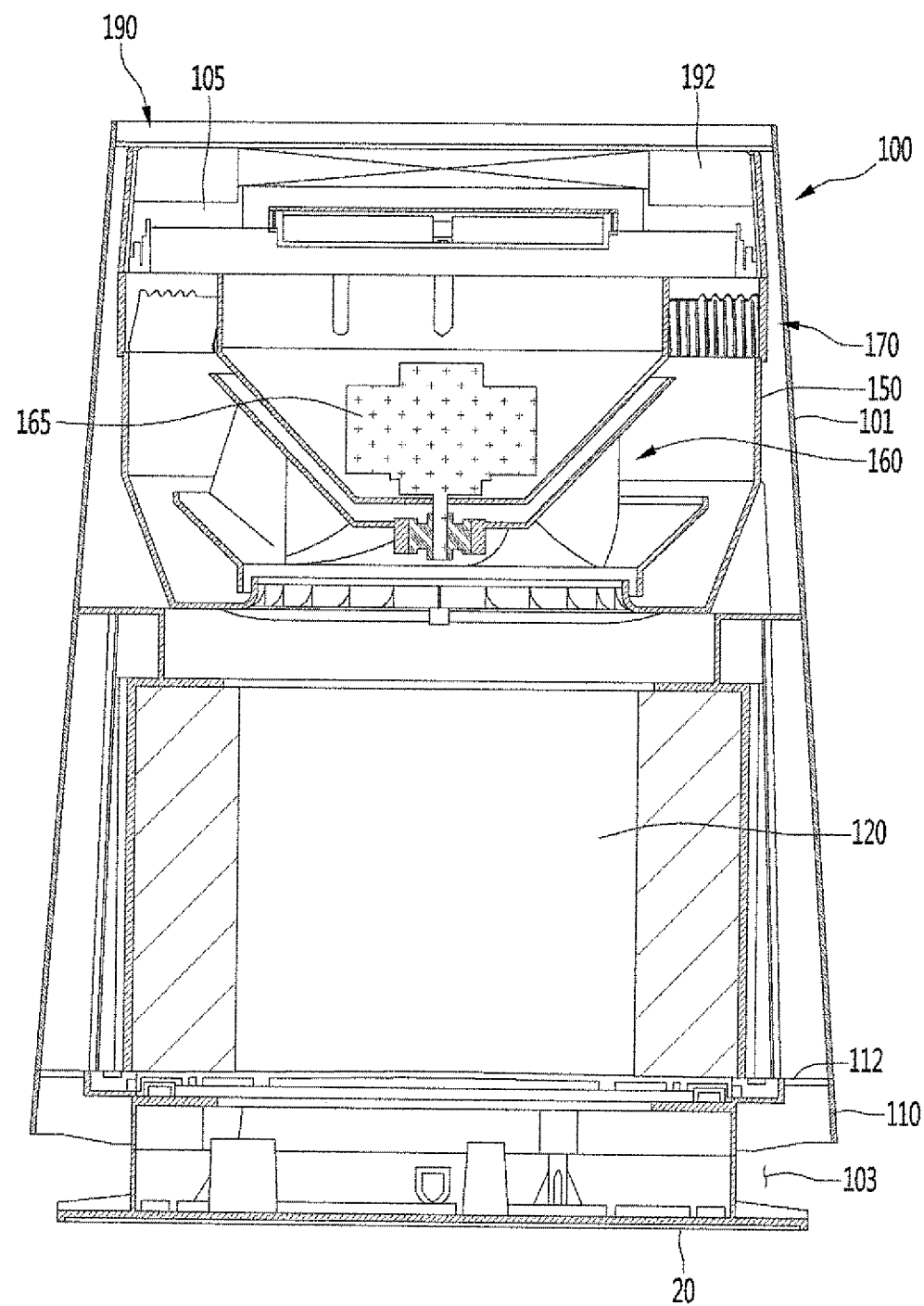
FIG. 4 is a cross-sectional view taken along line A-A' in FIG. 1.
Figure 5:
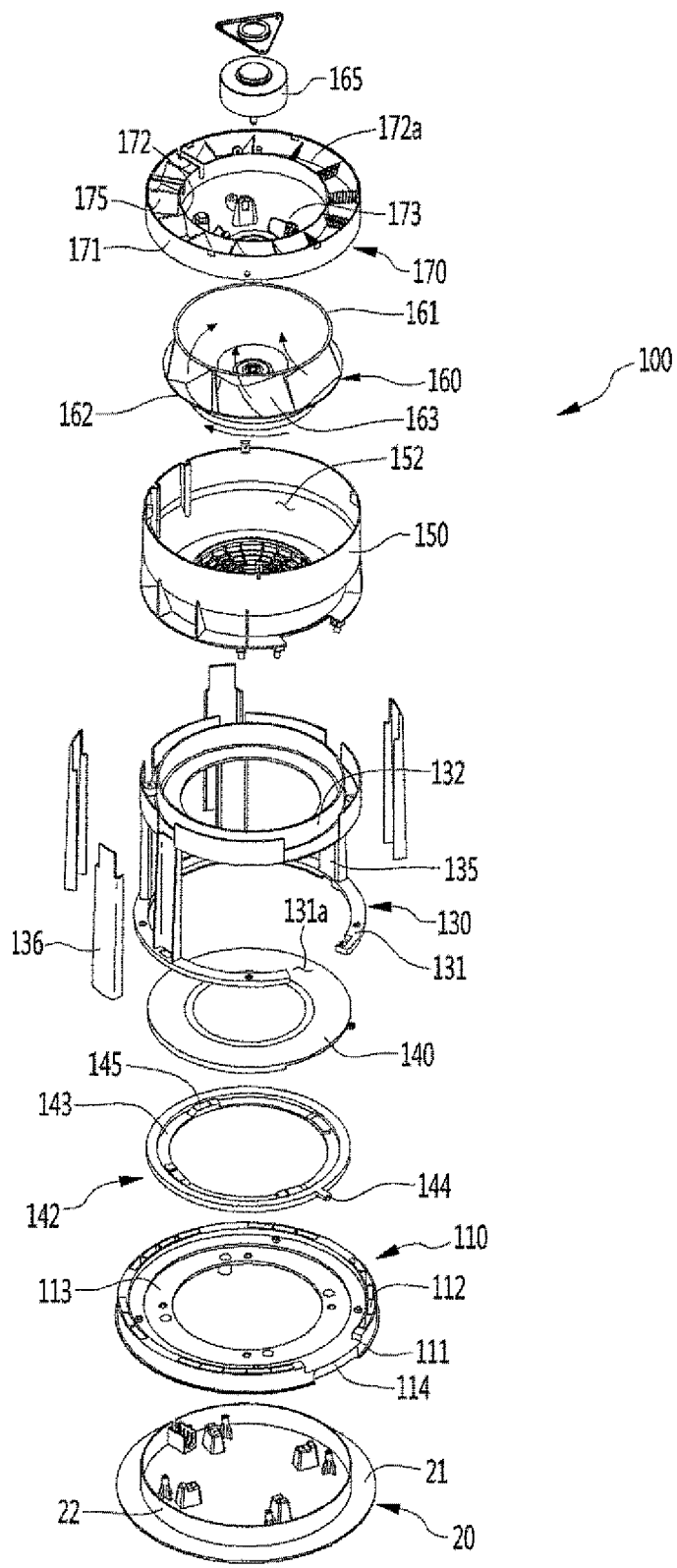
FIG. 5 is an exploded perspective view of an internal configuration of the main air purifier.

FIG. 4 is a cross-sectional view taken along the line A-A' of FIG. 1 showing an internal structure of the main air purifier, and FIG. 5 may be understood as a state in which the case 101 and the discharge guide device 190 from FIG. 4 are removed. Referring to FIGS. 4 and 5, a blower or suction assembly 100 may have a circular cross-sectional structure corresponding to a circular cross-sectional structure of an interior of the main air purifier 1. The suction assembly 100 may generate an air flow. Ambient air present in the room where the main air purifier 1 is placed may be suctioned through a lower side of the main air purifier 1, filtered, and discharged through an upper side of the main air purifier 1.

The main air purifier 1 may include a case 101 forming an outer structure or surface. The case 101 may have a cylinder shape or as a truncated cone shape having a diminishing diameter from a bottom end to a top end.

The case 101 may include a separating device or lock in which two separate shells constituting the case 101 are joined or separated to open and close the case 101. The case 101 may further include a hinge portion provided at a side of the case 101 opposite to a side of the case 101 having the lock so that the two shells may rotate about the hinge during opening and closing. When the case 101 is opened, the case 101 may further be separated or removed from the main air purifier 1 for replacement. The case 101 may also be opened to replace or repair internal devices (e.g., the blowing assembly 100) of the main air purifier 1.

A vertical direction as shown in FIG. 4 may be referred to as an axial direction, and a horizontal direction may be referred to as a radial direction. The axial direction may correspond to a central axis direction (i.e., a motor axial direction) of the fan 160. The radial direction may be perpendicular to the axial direction. A circumferential direction may be a circular direction rotating about the axial direction with a turning radius in the radial direction.

The main air purifier 1 may include a base 20 provided below the case 101. The base 20 may be configured to be placed on a floor or ground surface and to support the case 101 and the rest of the main air purifier 1. A bottom surface of the base 20 may be spaced downward from a lower end of the case 101 to form a base side suction portion 103 between the lower end of the case 101 and the bottom surface of the base 20.

A suction grill 110 may be provided below a bottom end of the case 101 and at an upper portion or side of the base 20. A suction port 112 may be formed at an edge of the suction grill 110. The base suction portion 103 may be a space between the base 20 and the suction grill 110, and may include or communicate with a suction port 112 formed in the suction grill 110. Air suctioned through the base side suction portion 103 may flow upward through a suction port 112.

A discharge port or portion 105 may be formed in an upper portion of the main air purifier 1. The discharge portion 105 may be formed in a discharge grill of a discharge guide device or discharge guide 190. The discharge grill of the discharge guide 190 may form an upper end or surface of the main air purifier 1.

Air discharged through the discharge portion 105 may flow upward in the axial direction toward the discharge guide 190 to be spread radially by the discharge grill 192. The discharge grill 192 may be formed of openings arranged in a spiral shape so that air discharged through the discharge grill 192 may have a speed or velocity component in the circumferential direction.

The base 20 may include a base body 21 placed on the floor and a base protrusion or flange 22 protruding upward from the base body 21. The suction grill 110 may be placed on the base protrusion 22. The base protrusion 22 may surround engagement devices provided on an upper surface of the base body 21 and configured to couple to holes formed in and/or engagement devices on a bottom of the grill body 111. The base protrusion 22 may space apart the base body 21 and the suction grill 110. The base side suction portion 103 may form an air suction space provided adjacent to the base body 21 and flange 22, the suction grill 110, and/or a bottom end of the case 101.

The suction grill 110 may include a grill body 111 having an approximate ring shape. The suction port 112 may be formed through an outer edge or rim of the grill body 111. A plurality of suction ports 112 may be spaced apart from each other along the outer rim of the grill body 111. The plurality of suction ports 112 may communicate with the base side suction port 103.

The main air purifier 1 may include a filter 120 provided above the suction grill 110 to filter air entering through the suction ports 112 and base side suction port 103.

Air may flow through a filter surface (i.e., an outer peripheral surface) of the filter 120 to an interior thereof. The filter 120 may be cylindrical, but embodiments disclosed herein are not limited thereto.

The suction grill 110 may include a lever support portion or inner edge 113 to form an upper surface of the grill body 111 and to support a lever or locking device 142. The lever support portion 113 may be an inner radial edge recessed downward from an outer portion or edge of the grill body 111. An outer peripheral surface of the grill body 111 may have a groove or opening 114. The groove 114 may provide a space in which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

The handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support the bottom of the filter support 140. The bottom of the filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated with respect to the support protrusions of the filter support 140. When an upper or higher portion of the lever protrusion 145 abuts or contacts a lower portion of the support protrusion, the filter support 140 may be pushed upward to fix a position of the filter 120. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward. In such a configuration, the inclined surfaces of the lever protrusion 145 and the support protrusion may be aligned. When the filter support 140 is descended downward, a space may be formed so that the filter 120 may be removed from the main air purifier 1.

The main air purifier 1 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. An inner space of the first frame 131 may form at least a part of an air flow passage or channel passing through the filter frame 130.

The lever device 142 and the filter support 140 may be provided within an inner circumferential surface of the first frame 131. An upper surface of the filter support 140 may include a seating surface on which the filter member 120 is placed. The first frame 131 may include a cutout portion or a handle space 131a that allows movement of the handle 144 of the lever device 142. The handle 144 may be rotated clockwise or counterclockwise in the handle space 131a to rotate the filter support 140.

The second frame 132 may be provided above and spaced apart from the first frame 131. The second frame 132 may have an approximate ring shape. An inner space of the second frame 132 may form at least a part of the air flow passage passing through the filter frame 130. An upper portion or surface of the second frame 132 may support a fan housing 150, which will be described later.

The filter frame 130 may further include a side support or wall 135 extending between rims of the first frame 131 and the second frame 132. The first and second frames 131 and 132 may be spaced apart from each other by the side support 135. A plurality of side supports 135 may be arranged in the circumferential direction and spaced apart from each other. A shape of the side supports 135 may resemble a partial arc and have a curvature matching a curvature of the first and second frames 131 and 132. A support cover 136 may be coupled to an outer surface of the side support 135.

A mounting space of the filter 120 may be defined by the first and second frames 131 and 132 and the plurality of side supports 135. Shapes of the first and second frames 131 and 132 and the side supports 135 may not be limited to circles to create a cylindrical mounting space for a cylindrical filter 120, and may be configured to correspond to alternative filter 120 shapes. For example, the filter 120 may have a cuboid shape, a curved cube or rectangle shape, or an ellipsoid shape, and the first and second frames 131 and 132 may have a square shape or rectangle shape, a curved square shape, cushion shape, or stadium shape, or an elliptical shape, respectively.

The filter 120 may be detachably mounted or seated in the mounting space. Air may be introduced through an outer peripheral (e.g., circumferential) surface of the filter 120. In the process of passing through the filter 120, impurities such as fine dust, dirt, or other debris in the air may be filtered. Air may be introduced into the filter 120 from any direction or at any angle with respect to the filter member 120. Accordingly, the filtering area of the air may be increased.

A mounting space may have a shape (e.g., cylindrical) corresponding to the shape of the filter 120. The filter 120 may be slidably received in the mounting space during a mounting or attachment process, and may be slidably drawn out from the mounting space in a separating or removal process.

During removal, the handle 144 may be operated to lower the filter support 140 and filter 120 into a release position. A vertical space or distance between the filter support 140 and the second frame 132 may be increased, and the filter 120 may be pulled or slid radially outward and separated from the mounting space.

During replacement, the filter 120 may be pushed or slid radially inward into the mounting space and may be placed on the upper surface of the filter support 140. The handle 144 may be operated to raise the filter support 140 and the filter 120 to an engagement position. The vertical distance between the filter support 140 and the second frame 132 may be decreased to secure the filter 120 between the filter support 140 and the second frame 132.

A suction pressure may be provided by a fan 160 to suction air through the base side suction portion 103 and through the filter 120. The fan 160 may be provided above the filter 120 to suction air upward.

A fan housing 150 may be provided at an outlet side (i.e., above) the filter 120. The fan 160 may be provided in the fan housing 150. The fan housing 150 may be supported by the second frame 132 of the filter frame 130.

An inner surface of a lower portion of the fan housing 150 may include a fan guide or fan recess 152, which may have an inner contour or shape configured to guide an inflow of air into the fan housing 150. A lower or bottom portion of the fan recess 152 may include a grill to prevent fingers or other objects from going into the fan housing 150 during removal and insertion of the filter 120.

The fan 160 may be or include a centrifugal fan to suction air in the axial direction and to discharge air upward in the radial direction. The fan 160 may include a hub 161 coupled to a rotation shaft of a fan motor 165, which may be a centrifugal fan motor. A plurality of shrouds 162 may be provided at an outer side of the hub 161, and a plurality of blades 163 may be provided or formed between the shrouds 162. The fan motor 165 may be coupled to the fan 160.

The hub 161 may have a bowl shape having a diameter or cross-sectional area that decreases in a downward direction. The hub 161 may include a shaft coupling portion to which the rotation shaft of the fan motor 165 is coupled and a first blade coupling portion that extends upward from the shaft coupling portion in an inclined manner.

The shroud 162 may include a shroud suction port provided at a bottom or lower end to suck air that has passed through the fan recess 152. A second blade coupling portion may extend upward from the lower end of the shroud 162.

One side of the blade 163 may be coupled to the first blade coupling portion of the hub 161 and the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan recess 152. The air may flow in the axial direction of the fan 160 and flow out via the blade 163. An edge of the blade may be inclined outward and upward with respect to the axial direction so that outflowing air may flow upward in the radial direction.

An air guide 170 may be coupled to the fan 160 to guide a flow of the air passing through or discharged from the fan 160. The air guide 170 may be provided above the fan housing 150. As an example, the air guide 170 may have an outer diameter corresponding to an outer diameter of the fan housing 150 and may be stacked onto the fan housing 150 to guide the flow of the air from the fan 160.

The air guide 170 may include an outer wall 171 having a cylindrical shape and an inner wall 172 having a cylindrical shape located inside the outer wall 171. The outer wall 171 may surround the inner wall 172 and be spaced apart from the inner wall 172 such that a diameter of the outer wall 171 is greater than a diameter of the inner wall 172. The diameter of the outer wall 171 may define an outer diameter of the air guide 170, and the diameter of the inner wall 172 may define an inner diameter of the air guide 170. A first air passage 172a through which air flows may be formed between an inner circumferential surface of the outer wall 171 and an outer circumferential surface of the inner wall 172.

The air guide 170 may further include a motor receiving portion or container 173 extending downward from the inner wall 172 to receive the fan motor 165. The motor receiving portion 173 may have a bowl shape having a diameter that decreases in the downward direction. A motor coupler or fastener may be provided on a side of the fan motor 165, and the motor coupler may guide and fix the fan motor 165 to the air guide 170. The shape of the motor receiving portion 173 may correspond to a shape or inner contour of the hub 161 so that the motor receiving portion 173 may be inserted into the hub 161.

The fan motor 165 may be supported by an upper side of the motor receiving portion 173. The rotation shaft of the fan motor 165 may extend downward from the fan motor 165 and may be coupled to the shaft coupling portion of the hub 161 through an opening or hole formed in a bottom of the motor receiving portion 173.

The air guide 170 may further include a guide vane or rib 175 provided in the first air passage 172a. The guide vane 175 may extend from the outer circumferential surface of the inner wall 172 to the inner circumferential surface of the outer wall 171, and may extend upward in an oblique or inclined way from a lower portion of the outer wall 171 and the inner wall 172. The guide vanes 175 may be spaced apart from one another. The guide vanes 175 may add structural rigidity to the air guide 170.

The plurality of guide vanes 175 may function to guide the air introduced into the first air passage 172a from the fan 160 upward, and a shape or inclination of the guide vanes 175 may be configured to discharge air at a predetermined angle. For example, each guide vane 175 may be rounded or curved to guide the air to flow upward in the axial direction. An optional display may be provided at the top of the main air purifier 1.

Figure 6:
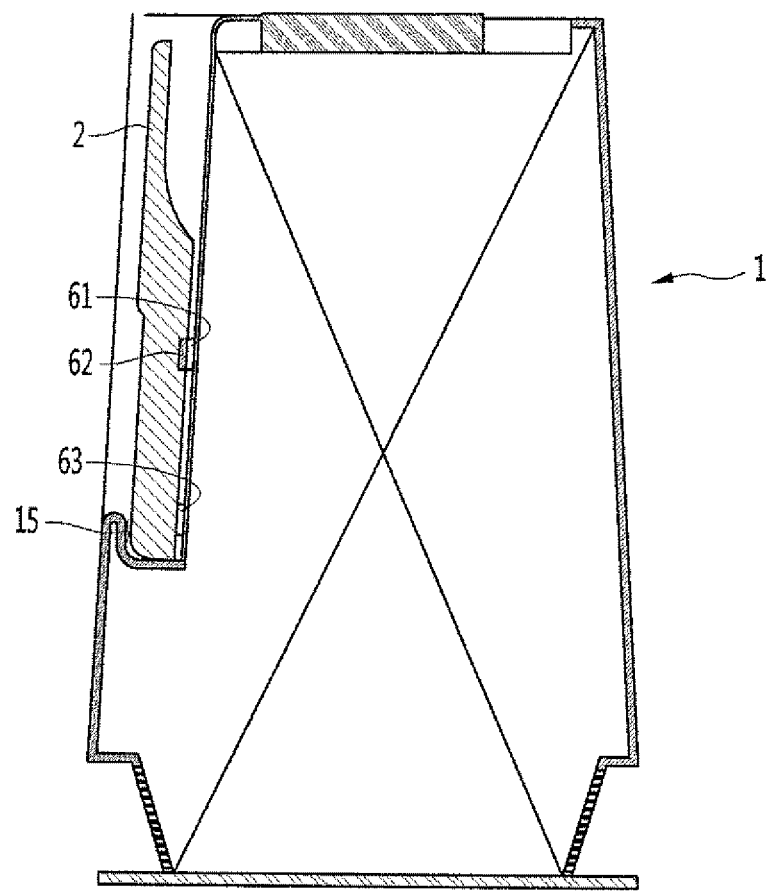
FIG. 6 is a sectional view taken along line B-B' in FIG. 1.

Referring to FIG. 6, the mounting portion 15 may be formed on a front side of the outer surface of the main air purifier 1. The mounting portion 15 may extend in a longitudinal direction (i.e., vertical direction) down the case 101. The handheld air purifier 2 may be inserted into and seated on the mounting portion 15.

Referring to FIGS. 3 and 6, the suction body 31 of the handheld air purifier 2 may be placed in the mounting portion 15 so that the handle 32 extends upward. A bottom end of the mounting portion 15 may extend or curve upward to hold the suction body 31 in place. The mounting portion 15 may resemble a pocket. According to such a seating structure, a user may easily grasp the handle 32. However, embodiments disclosed herein are not limited to the seating structure shown in FIG. 6; for example, the mounting portion 15 may instead be a hook, and the handle 32 may be inserted into the hook and/or the suction body 31 may hang from the hook. As another example, the mounting portion 15 may be a recess or pocket configured to hold the handle 32 instead of the suction body 31.

Magnetic coupling may be used to further secure the handheld air purifier 2 to the main air purifier 1 during mounting. One of the handheld air purifier 2 and the main air purifier 1 may have a magnet, and the other of the handheld air purifier 2 and the main air purifier 1 may have a metal or a magnet having an opposite polarity. When the handheld air purifier 2 is mounted on the mounting portion 15, the magnets and/or the magnet and the metal may be aligned.

For example, a magnet 62 may be provided behind a front surface of the suction body 31 of the handheld air purifier 2. A magnet 61 having an opposite polarity of the magnet 62 may be provided at a position in the mounting portion 15 to align with the magnet 61 when the handheld air purifier 2 is seated in the mounting portion 15. The magnet 62 may be attached to the outer surface of the case 101, or alternatively behind the case 101 in an interior of the main air purifier 1. The magnets 61 and 62 may prevent the handheld air purifier 2 from tipping or falling over when seated on the mounting portion 15.

The mounting portion 16 may further include a mounting or seating sensor 63 to sense whether the handheld air purifier 2 is mounted on the main air purifier 1. The seating sensor 63 may be any sensor capable of detecting an approach of the handheld air purifier 2, for example, a weight sensor, a light sensor, a hall sensor, or a sensor to sense a change in an electrical or physical signal that may be altered by the seating of the handheld air purifier 2 such as reflected radio wave sensing, electrical shorting, mechanical switching, optical signal disconnection, etc. The seating sensor 63 may be placed at a position adjacent to where the handheld air purifier 2 is placed when mounted on the mounting portion 15.

An operation of the air purifying system may be based on a sensing by the seating sensor 63 on whether the handheld air purifier 2 is mounted or separated from the main air purifier 1. As an example, the handheld air purifier 2 may automatically stop operating once the seating sensor 63 senses that the handheld air purifier 2 is mounted on the mounting portion 15, and the handheld air purifier 2 may automatically start operating once the seating sensor 63 senses that the handheld air purifier 2 has been lifted and separated from the mounting portion 15.

The mounting portion 15 may be further provided with a charging module or portion to charge the handheld air purifier 2. For example, the handheld air purifier 2 may have a battery to operate the fan 35, which may be charged via a wireless power transfer (WPT) method. A position of the battery may not be limited and may be provided in the handle 32, the suction body 31, the bending portion 37, etc. The main air purifier 1 may optionally have a battery so that the main air purifier 1 may operate even if it is disconnected from an external power supply. As another example, the handheld air purifier 2 may alternatively be connected to the main air purifier 1 via a cable or wire.

The main air purifier 1 may have a wireless power transmitter or a wireless power transceiver that aligns with a wireless power receiver or a wireless power transceiver in the handheld air purifier 2 when the handheld air purifier 2 is mounted on the main air purifier 1. As an example, a wireless power transceiver may be located in the mounting portion 15 of the main air purifier 1, and a wireless power transceiver may be located in the suction body 31 of the handheld air purifier 2.

In addition, an ultraviolet sterilizing portion capable of disinfecting the suction surface 33 may be provided in the mounting portion 15. The ultraviolet sterilizing portion may be an ultraviolet light emitting device in the light 38 of the mounting portion 15, or alternatively may be a separate light device.

Figure 7:
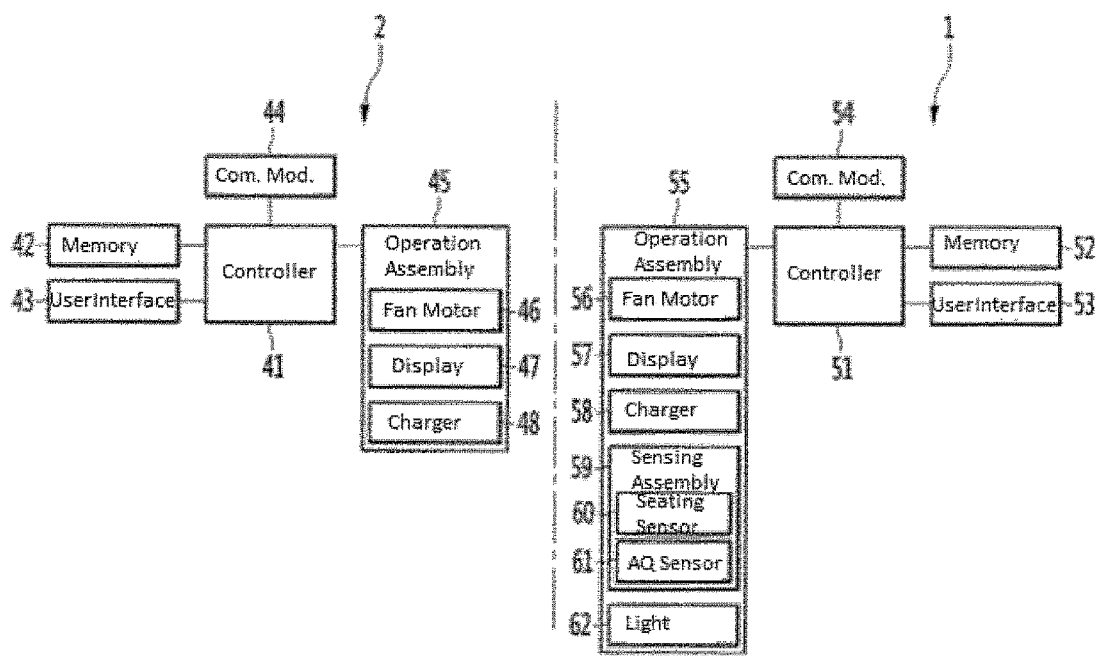
FIG. 7 is a block diagram of an air purifying system.

Referring to FIG. 7, a configuration of the air purifying system may be similar to that already described with reference to FIGS. 1-6, but different reference numbers may be given for the sake of precise description. For example, the fan 35 of the handheld air purifier 2 in FIG. 3 may be included in a fan drive device 46 in FIG. 7, which may also include a power supply device to operate the fan 35.

The air purifying system may include a main air purifier 1 and a handheld air purifier 2, which may be freely attachable to and detachable from the main air purifier 1. The main air purifier 1 may be provided with a controller 51 to control the main air purifier 1, a driving or operation assembly 55, a memory 52 to store various information necessary for operation, a communication module 54 to communicate with the handheld air purifier 2 and/or to obtain external data, and a user interface or operation device 53 into which operation information may be input. The main air purifier 1 may connect to a power supply to supply power for operation. The controller 51 may control the memory 52, communication module 54, and the operation assembly 55 based on information received by the communication module 54, information stored in the memory 52, measurements taken by a sensing assembly 59, or commands input into the user interface 53.

The operation assembly 55 may include a display 57 to display operation information and indoor environment information of the main air purifier 1, a fan driving device or motor 56 to suction outside air to perform air purifying, a charging device or charger 58 (e.g., wireless power transmitter or transceiver), a sensing assembly 59 to sense external or environmental conditions and a mounting of the handheld air purifier 2, and a lighting device or light 62 to emit light. The sensing assembly 59 may include a seating sensor 60 to detect a mounting and dismounting of the handheld air purifier 2 and a dust or air quality sensor 61 ("AQ sensor in FIG. 7) to sense a degree of pollution or contamination of an indoor environment in which the main air purifier 1 is placed. The charging device 58 may charge a charging device or charger 48 (e.g., wireless power receiver or transceiver) of the handheld air purifier 2.

The communication module 54 ("Com. Mod" in FIG. 7) connected to the controller 51 may be connected to an external device (e.g., a server) to perform communication. The communication module 54 may implement wireless communication and may be, e.g., a BlueTooth or WiFi module, or alternatively may use a wired communication. The communication module 54 may communicate with a communication module 44 of the handheld air purifier 2 to exchange data (e.g., air quality data, operation status, or location data). The communication module 54 may also communicate with a fixed or portable internet of things (IOT) device 202 or 203 (FIGS. 12 and 13) that sense air quality or another external air quality sensor. The communication module 54 may optionally receive data from an external application or data source, for example, air quality or weather forecast information stored online, and may be able to transmit data to a mobile or web application.

The handheld air purifier 2 may include a controller 41 to control the handheld air purifier 2, a driving or operation assembly 45, a memory 42 to store various information necessary for operation, a communication module 44 ("com. Mod." In FIG. 7) to communicate with the main air purifier 1 and/or to obtain external data, and a user interface or operation device 43 into which operation information may be input. The controller 41 may control the memory 42, communication module 44, and the operation assembly 45 based on information (e.g., mounting information or air quality information measured by the sensor assembly 59) received by the communication module 44, information stored in the memory 42, commands input into the user interface 43, charging information, or measurements taken by an optional sensing assembly.

The operation assembly 45 may include a fan driving device or motor 46 to suction outside air to perform air purifying, a display 47 that displays operation information, charging information, and indoor environment information of the handheld air purifier 2, and the charging device 48 to charge a battery. The communication module 44 may be similar to the communication module 54 of the main air purifier 1 and may connect to the communication module 54 and/or an external device (e.g., a server) to perform communication. The communication module 44 may implement wireless communication and may be, e.g., a BlueTooth or WiFi module, or alternatively may use a wired communication. The communication module 44 may exchange data (e.g., air quality data, operation status, or location data) with the communication module 54 of the main air purifier 1. The communication module 44 may also communicate with a fixed or portable IOT device 202 or 203 (FIGS. 12 and 13) that sense air quality or another external air quality sensor. The communication module 54 may optionally receive data from an external application or data source, for example, air quality or weather forecast information stored online, and may be able to transmit data to a mobile or web application.

Operations of the main air purifier 1 and handheld air purifier 2 may be controlled by the controllers 51 and 41, respectively, based on operation status data exchanged via the communication modules 54 and 44. The handheld air purifier 2 may be charged by a connection between the charging devices 48 and 58 when the seating sensor 60 indicates that the handheld air purifier 2 is mounted on the main air purifier 1.

When the seating sensor 60 indicates that the handheld air purifier 2 is separated from the main air purifier 1, the seating sensor 60 may transmit a predetermined or separation signal to the controller 51 of the main air purifier 1. Upon receiving the predetermined signal, the controller 51 of the main air purifier 1 may change a control state of the air purifying system. For example, the air purifying system may operate in a "mounted state" when the handheld air purifier 2 is mounted on the main air purifier 1 and a "separated state" when the handheld air purifier 2 is separated from the main air purifier 2 (i.e., when the controller receives the predetermined signal). For example, in the separated state, the light device 62 may be turned on, and/or an ultraviolet light optionally included in the light device 62 may be turned off.

In the "mounted state," the fan driving device 46 of the handheld air purifier 2 may not be operated while the fan driving device 56 of the main air purifier 1 may be operated. In the "separated state," the fan driving device 46 of the handheld air purifier 2 may be operated, along with the fan driving device 56 of the main air purifier 1 so that any scattered dust may be suctioned. The handheld air purifier 2 may not provide as high or strong of a filtration performance as the main air purifier 1 due to a narrow internal space of the suction body 31, and some fine dust may not be suctioned through the suction portion 33 and instead escape to a periphery of the handheld air purifier 2 during a sweeping motion on a targeted surface. The main air purifier 1 may suction fine dust not suctioned by the handheld air purifier 2.

An operation of the fan driving device 56 of the main air purifier 1 may be synchronized with an operation of the fan driving device 46 of the handheld air purifier 2. For example, speeds of the fans in the fan driving devices 56 and 46 may change based on a mounting status of the handheld air purifier 2, based on air quality information acquired from the air quality sensor 61 or based on data from the IOT devices 202 and 203 (FIGS. 12-13), or other conditions. Various control methods of the air purifying system will be described below.

Figure 8:
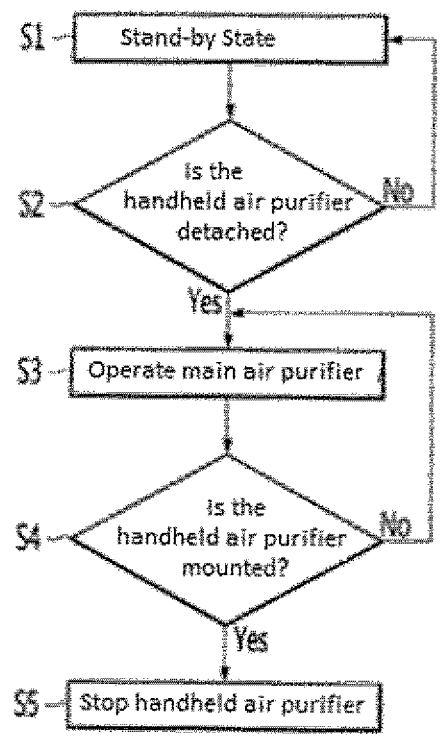
FIG. 8 is a flow chart illustrating a control method of the air purifying system according to an embodiment.

Referring to FIGS. 7-8, the handheld air purifier 2 may be seated on the main air purifier 1, and an interlocking operation between the handheld air purifier 2 and the main air purifier 1 may be in a stand-by state (S1). In the standby state, the main air purifier 1 may be operating or not operating. The seat sensor 60 may periodically sense whether the handheld air purifier 2 is separated from the main air purifier 1 (S2).

If the handheld air purifier 2 is detached thereafter ("Yes"), the seat sensor 60 may indicate, via a separation signal, that the handheld air purifier 2 is not mounted to the main air purifier 1 (S2). The controller 51 of the main air purifier 1 may operate the operation assembly 55 based on the separation signal (S3).

As an example of a type of operation that may occur during S3, the main air purifier 1 and the handheld air purifier 2 may be turned on to operate together. The handheld air purifier 2 may suction rather than blow air containing dust. Scattering dust may be eliminated, and dust diffused into an indoor space may be reduced. However, despite the suction method implemented by the handheld air purifier 2, some dust may diffuse to its periphery due to a weaker suction strength and/or lower air cleaning capacity of the handheld air purifier 2. If a user sweeps the handheld air purifier 2 back and forth across a targeted surface (e.g., clothing), some finer dust may simply fall off the clothing to contaminate a floor, the indoor air, and surroundings. Such errant dust may be suctioned and filtered instead by the main air purifier 1, and scattering dust in may be further reduced. A synchronized or interlocking operation between the handheld air purifier 2 and the main air purifier 1 may be automatic without prompting by a user's command. Such automatic interlocking operation may improve cleanliness and comfort of an indoor environment and convenience of the air purifying system.

The seating sensor 60 may periodically sense whether the handheld air purifier 2 has mounted back onto the main air purifier 1 (S4). If the handheld air purifier 2 has not been mounted ("No"), then interlocked operation of the handheld air purifier 2 may resume. If the seating sensor 60 indicates that the handheld air purifier 2 has been mounted on the main air purifier 1 ("Yes"), then an operation of the handheld air purifier 2 may be stopped (S5). Alternatively or in addition thereto, an operation of the main air purifier 1 may be stopped.

Figure 9:
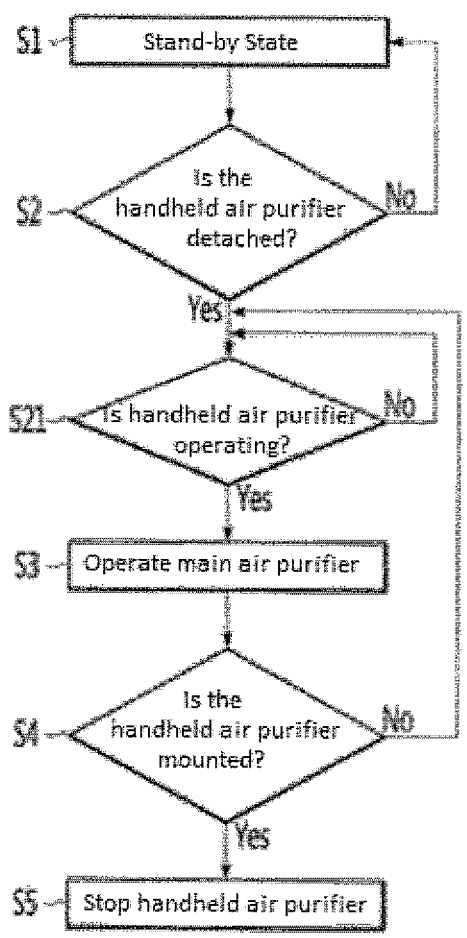
FIG. 9 is a flowchart illustrating a control method of an air purifying system according to another embodiment.

A control method shown in FIG. 9 may be the same as that of FIG. 8, and may differ only in an operation of the main air purifier 1. Referring to FIG. 9, the main air purifier 1 may not start simultaneously with the handheld air purifier 2 and may instead start at a time after.

S1 may be the same standby step as in FIG. 8. S2 may be the same sensing step as in FIG. 8. If the seating sensor 60 indicates that the handheld air purifier 2 is separated from the main air purifier 1 ("Yes"), the handheld air purifier 2 may be operated, but the main air purifier 1 may remain off or turn off if it was previously operating (S21).

During S21, an operation status of the handheld air purifier 2 may be periodically transmitted to the main air purifier 1 via the communication modules 44 and 54. If the handheld air purifier 2 has not been started (either automatically or, alternatively, manually by a user), the operation status of the handheld air purifier 2 may continue to be exchanged. Once the handheld air purifier 2 has started ("Yes"), the main air purifier 1 may be operated in step S3. Such a delayed operation of the main air purifier 1 may reduce unnecessary power consumption. S4 and S5 may be the same sensing and stopping steps as in FIG. 8, respectively.

Figure 10:
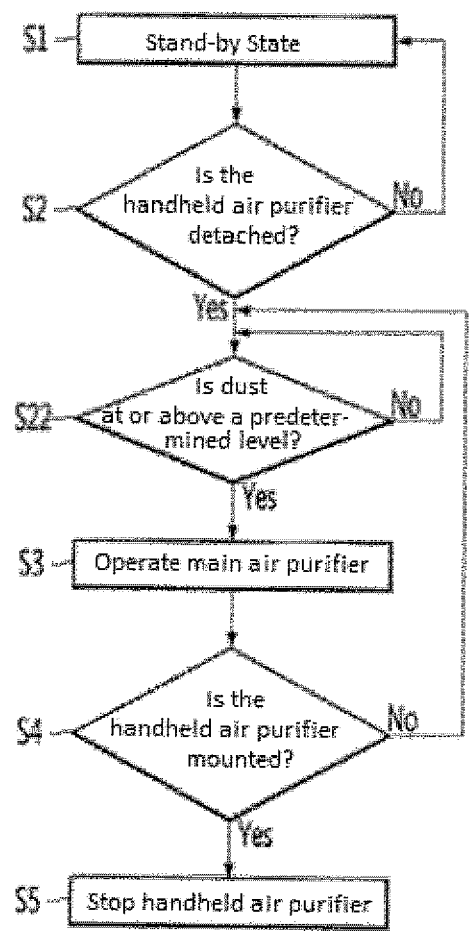
FIG. 10 is a flow chart illustrating a control method of an air purifying system according to another embodiment.

A control method shown in FIG. 10 may be the same as that of FIGS. 8 and 9, and may differ only in an operation of the main air purifier 1. Referring to FIG. 10, the main air purifier 1 may be not operated immediately even if the handheld air purifier 2 is detached or started. Instead, the main air purifier 1 may wait to operate until dust is detected by the air quality sensor 61.

S1 may be the same standby step as in FIGS. 8 and 9. S2 may be the same sensing step as in FIGS. 8 and 9. If the seating sensor 60 indicates that the handheld air purifier 2 is separated from the main air purifier 1 ("Yes"), the handheld air purifier 2 may be operated, but the main air purifier 1 may remain off or turn off it was previously operating (S22).

During S22, a pollution or contamination level of an indoor space may be periodically measured by the dust sensor 61 and transmitted to the main air purifier 1. If the dust sensor 61 does not sense dust and/or measures the contamination level to be below a predetermined contamination level, the contamination level may continue to be measured and exchanged. Once the dust sensor 61 indicates that the contamination level is at or above the predetermined contamination level ("Yes"), the main air purifier 1 may be operated in step S3. S22 may optionally measure and transmit an operation status of the handheld air purifier 2, and proceeding to step S3 may optionally require that the handheld air purifier 2 is operating, in addition to dust being detected at or above the predetermined contamination level. Such a delayed operation of the main air purifier 1 may reduce unnecessary power consumption. S4 and S5 may be the same sensing and stopping steps as in FIGS. 8 and 9, respectively.

Figure 11:
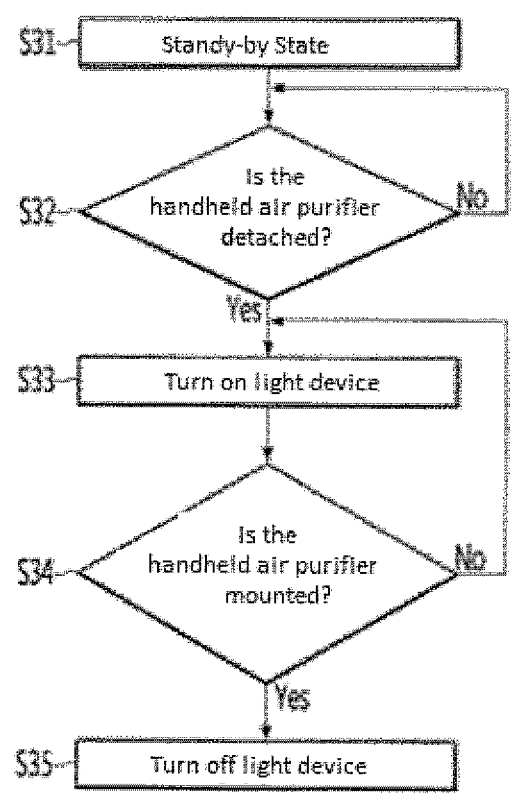
FIG. 11 is a flowchart illustrating a control method of an air purifying system according to another embodiment.

Referring to FIGS. 7 and 11, a control method shown in FIG. 11 focuses on an operation of the light device 62 of the main air purifier 1. The control method shown in FIG. 11 may be combined with any of the control methods of the air purifying system shown in FIGS. 8-10.

The first two steps S31 and S32 may be similar to the standby steps and mounting sensing steps of FIGS. 8-10. The handheld air purifier 2 may be mounted on the main air purifier 1, and an interlocking operation between the handheld air purifier 2 and the main air purifier 1 may be in a standby state (S31). In the standby state, the main air purifier 1 may be operating or turned off. The seating sensor 60 may periodically sense whether the handheld air purifier 2 has been separated from the main air purifier 1 (S32). If the handheld air purifier 2 has not been separated ("No"), the standby state S31 and sensing S32 may resume.

If the handheld air purifier 2 has been separated ("Yes"), the seating sensor 60 may send a separation signal to the controller 51. The controller 51 may control the light device 62 to turn on based on the separation signal (S33). The light device 62 may illuminate an area near the main air purifier 1 in which a garment to be treated by the handheld air purifier 2 may be placed. The user may conveniently remove dust from the garment using illumination from the light device 62. Alternatively or in addition thereto, the handheld air purifier 2 may have a light device that is turned on upon separation from the main air purifier 1. Such an alternative light device may be on a same side of the handle 32 and/or suction body 32 that the suction surface 33 is provided so that the light device may emit light toward the garment during treatment.

The light device 62 may correspond to the light 38 as shown in FIG. 2. Since the light device 62 may turn on once the handheld air purifier 2 is separated and since such light emitted from the light device 62 may be more visible when the handheld air purifier 2 is separated, the light device 62 may serve to inform a user of a separation of the handheld air purifier 2.

The light device 62 may be provided close to the mounting portion 15 of the main air purifier 1. The user may apply the suction surface 33 of the handheld air purifier 2 along an outer surface of the garment on which light from the light device 62 may be shined, and the main air purifier 1 may quickly suction scattered dust that is not suctioned by the handheld air purifier 2, improving convenience and accuracy.

The light device 62 may be close to a suction portion of the main air purifier 1. The user may be encouraged, by the light emitted by the light device 62, to remove dust from clothes in the vicinity of the main air purifier 1. Accordingly, a position of the main air purifier 1 and a dusty garment may be close so that the main air purifier 1 may suction dust that may not be filtered and instead scattered by the handheld air purifier 2. As a result, a floor and indoor space around the air purifying system may be cleaner. Since a suction portion (e.g., suction portion 103) of the main air purifier 1 may be provided toward a bottom portion of the main air purifier 1, falling dust may be suctioned through and filtered in the main air purifier 1.

The seating sensor 60 may periodically sense whether the handheld air purifier 2 is mounted back on the main air purifier 1 (S34). If the seating sensor 60 does not sense that the handheld air purifier 2 is mounted on the main air purifier 1 ("No"), the light device 62 may continue to emit light in step S33. If the seating sensor 60 senses that the handheld air purifier 2 is mounted on the main air purifier 1 ("Yes"), the light device 62 may be turned off (S35). In addition, the main air purifier 1 may be turned off, along with the handheld air purifier 2.

Alternatively, an operation of the handheld air purifier 2 and the illumination device 62 may be linked. When the handheld air purifier 2 is turned on (either manually or in accordance with any of the control methods shown in FIGS. 8-10), its "on" status may be communicated to the controller 51 of the main air purifier 1 via the communication modules 44 and 54, and the light device 62 may be turned on. When the handheld air purifier 2 is turned off, the light device 62 may be turned off.

When foreign materials are attached to a user's clothes and garments, the main air purifier 1, the handheld air purifier 2, and optionally the light device 62 may work together to efficiently and conveniently remove the foreign materials. However, the air quality sensor 61 may, in certain cases, not provide an accurate estimate on how much dust is actually attached to the clothes or what kind of outdoor air the clothes were exposed to. This may occur when, for example, a person has worn clothes in a dustier environment than an immediate environment surrounding the main air purifier 1.

It may be necessary to operate the air purifying system according to the air quality sensor 61, and may instead be necessary to consider weather forecasts, news, or air qualities measurements at other locations. Some of this data may be optionally obtained by the communication modules 54 and 44 in interacting with weather forecast apps, the internet, or IOT devices such as the air quality IOT devices 202 and 203 (FIGS. 12-13) that measure air quality. However, if such data is not available or attainable, the user may control the air purifying system based on his own perceptions of air quality or his own outside information.

The following examples describing use of the air purifying system based on more accurate information may be based on the above-described embodiments. As an example, supplemental information to create an accurate estimate of dust on clothes may be obtained by portable IOT devices (FIGS. 13-14) and fixed IOT devices (FIG. 12).

Figure 12:
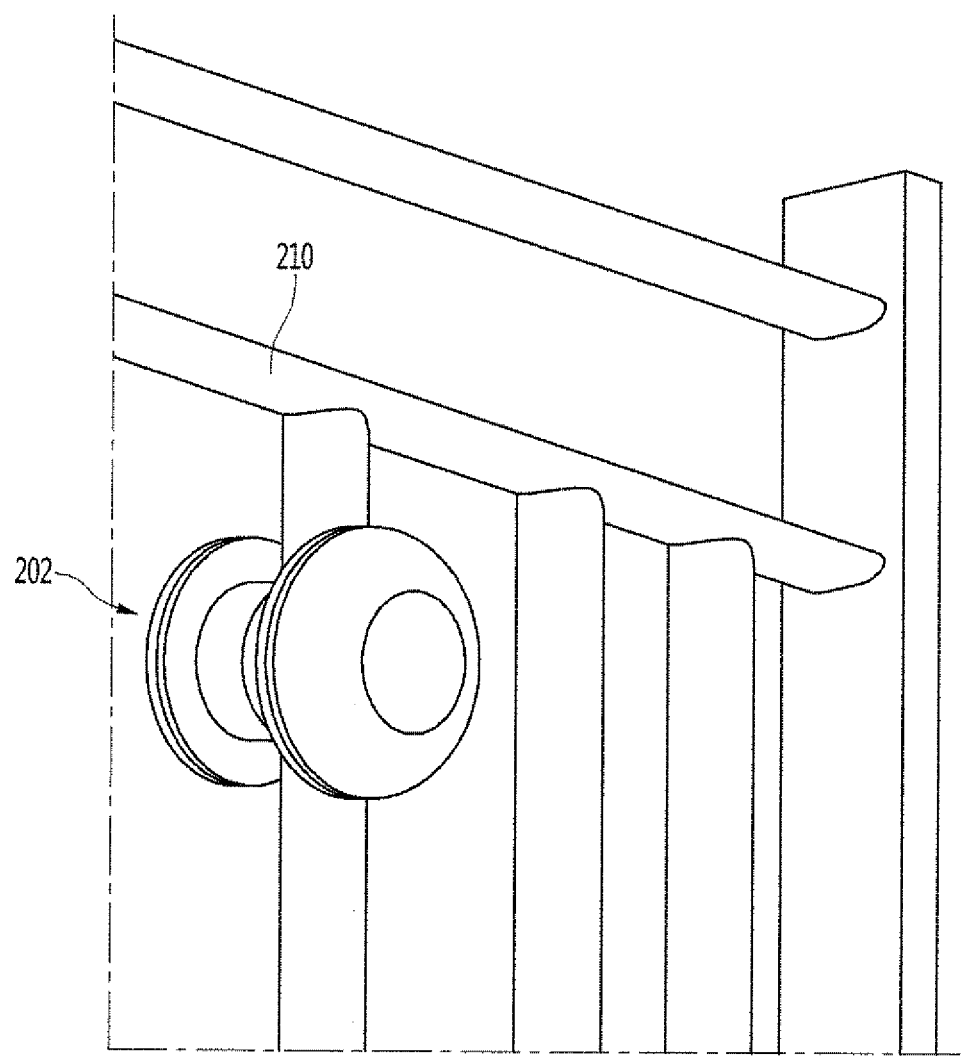
FIGS. 12 to 14 show various uses for an air quality sensor internet of things (IOT) device, FIG. 12 showing a fixed type and FIGS. 13 and 14 showing portable types.

Referring to FIG. 12, a fixed IOT device 202 may be provided at or installed on a railing 210 provided outside of a building. An air purifying system may be installed inside of the building. The fixed IOT device 202 may acquire air quality information of an outdoor space immediately outside of the building in which the air purifying system is installed, and can transfer the acquired air quality information to the air purifying system. The fixed IOT device 202 may also store time information.

The fixed IOT device 202 may adhere to the railing or building or have a press-fit or snap-fit coupling mechanism, a clip, etc. to couple to an external structure. The fixed IOT device 202 may optionally include a plug or terminal to be plugged into an external power supply. As the fixed IOT device 202 may be permanently fixed outside (e.g., nailed, welded, or glued to an external structure), the fixed IOT device 202 may have an optional solar panel to charge, via solar power, a battery provided inside the fixed IOT device 202.

One of ordinary skill in the art will appreciate that the fixed IOT device 202 may be attached to any structure so that a user may monitor or estimate cleanliness. For example, the fixed IOT device 202 may be installed in a garage, storage shed, or attic so that a user may monitor accumulating dust.

Figure 13:
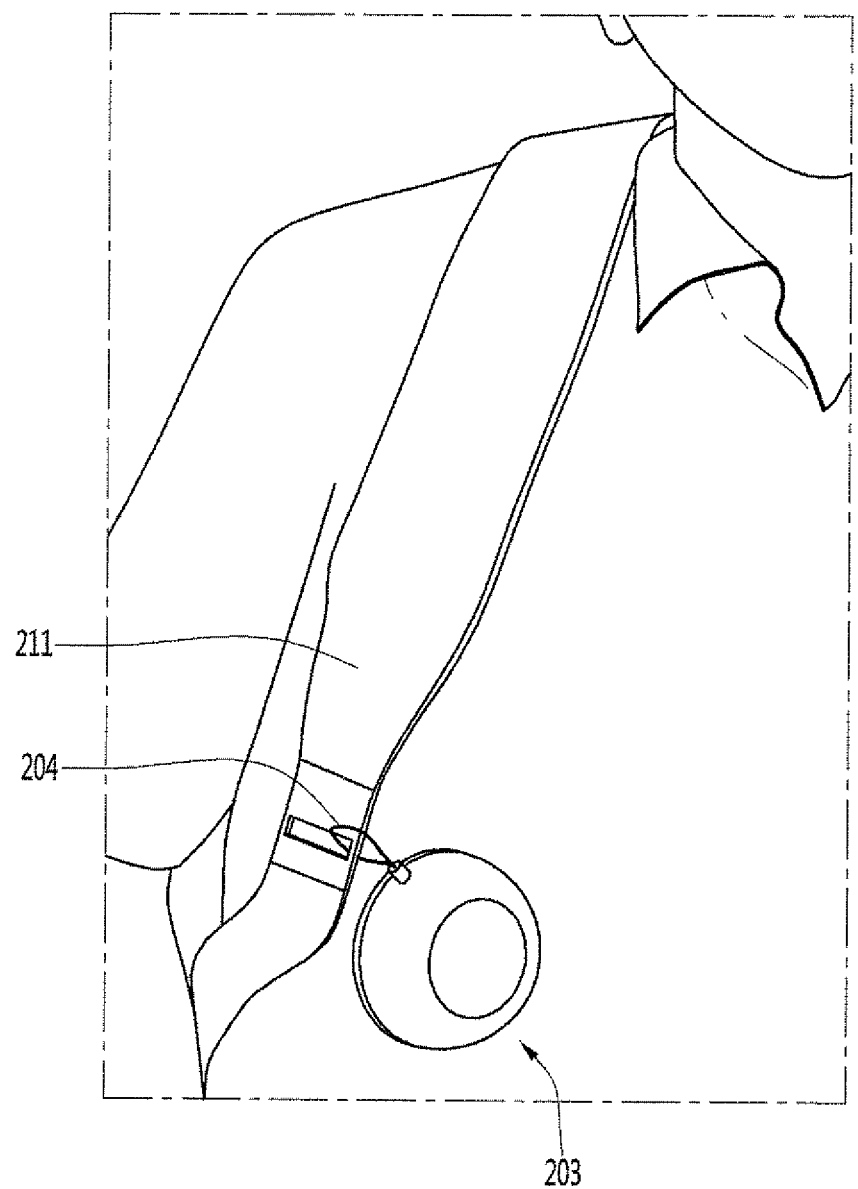

Referring to FIG. 13, a portable IOT device 203 may be small enough to travel with a user. The portable IOT device 203 may be provided with a strap 204 to attach to a user, his clothes (e.g., shirts, belt loops, jackets, pockets, zippers, hats, buckles, buttons, etc., his accessories (e.g., backpacks, handbags, bracelets, umbrellas, etc.), or anywhere near his body. The strap 204 may be, for example, an elastic strap, but embodiments disclosed herein are not limited thereto. The portable IOT device 203 may measure and store the air quality at the user's location while traveling with the user. The portable IOT device 203 may also measure and store location data and time data.

Figure 14:
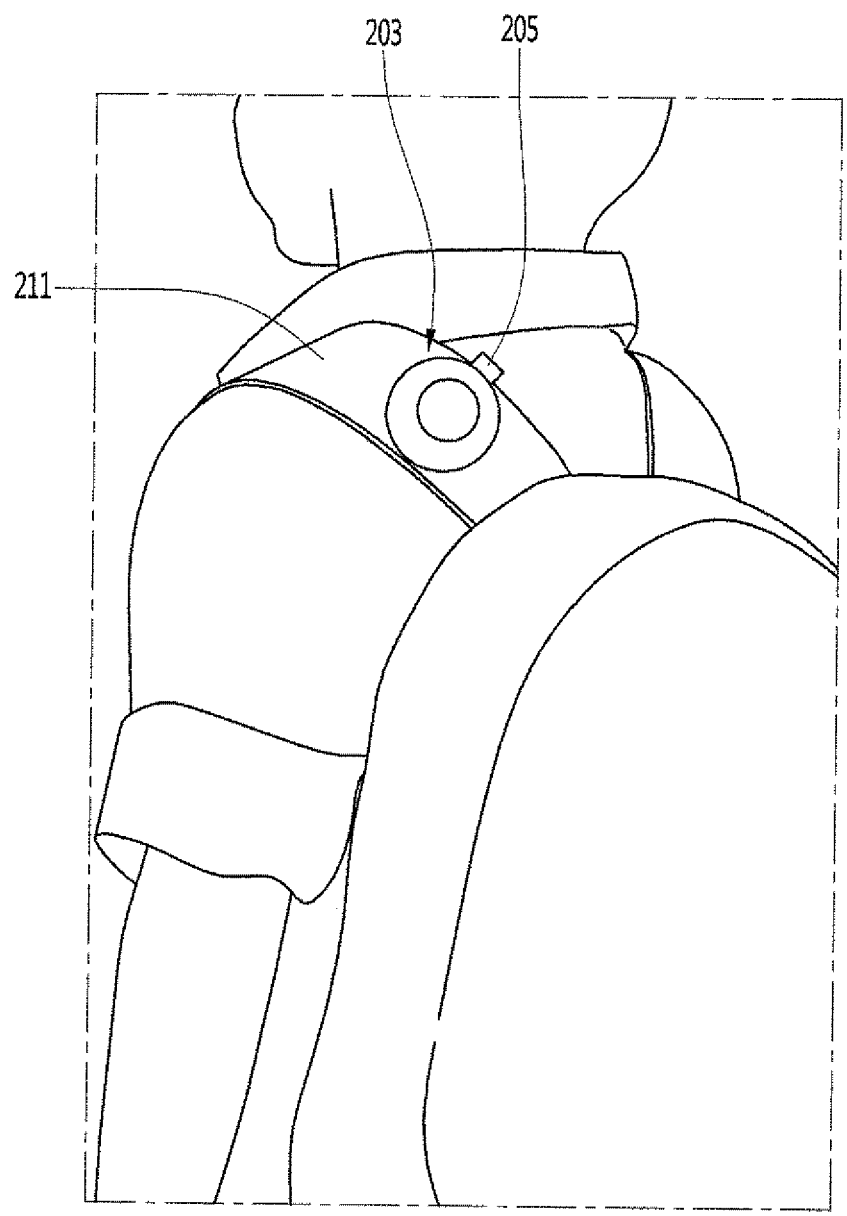

Referring to FIG. 14, the portable IOT device 203 may alternatively be provided with a clip 205 to attach to a user, his clothes (e.g., shirts, belt loops, jackets, pockets, zippers, hats, buckles, buttons, etc., his accessories (e.g., backpacks, handbags, bracelets, umbrellas, etc.), or anywhere near his body.

Referring to FIGS. 13 and 14, the portable IOT device 203 may attach to a bag end or strap 211, which may be an easy mounting position of the portable IOT device 203. The portable IOT device 203 may be fastened to the bag strap via the strap 204 or clip 205, but embodiments disclosed herein are not limited thereto. For example, the portable IOT device 203 may be implemented as jewelry and worn as a necklace or bracelet, or alternatively may be implemented in a smartwatch, smartphone, etc. As another alternative, a user may wish to attach a portable IOT device 203 to an outdoor pet (e.g., on a collar or ID tag for a cat or dog) so that the user can estimate how dirty his pet is. One of ordinary skill in the art should appreciate that the portable IOT device 203 may attach to any item that travels or is stored outside so that a user may be more aware of how dirty the item is, including cars or trucks, outdoor or shared toys, kids, etc. In addition, the portable IOT device 203 may be used in place of the fixed IOT device 202 by attaching the portable IOT device 203 to an external structure such as a railing outside of a building.

The portable IOT device 203 may have a terminal for wired charging when the user returns home. Alternatively or in addition thereto, the portable IOT device 203 may include a wireless power transceiver to charge via a wireless power charging method (e.g., on a charging pad) or may have a solar panel capable of solar power.

Figure 15:
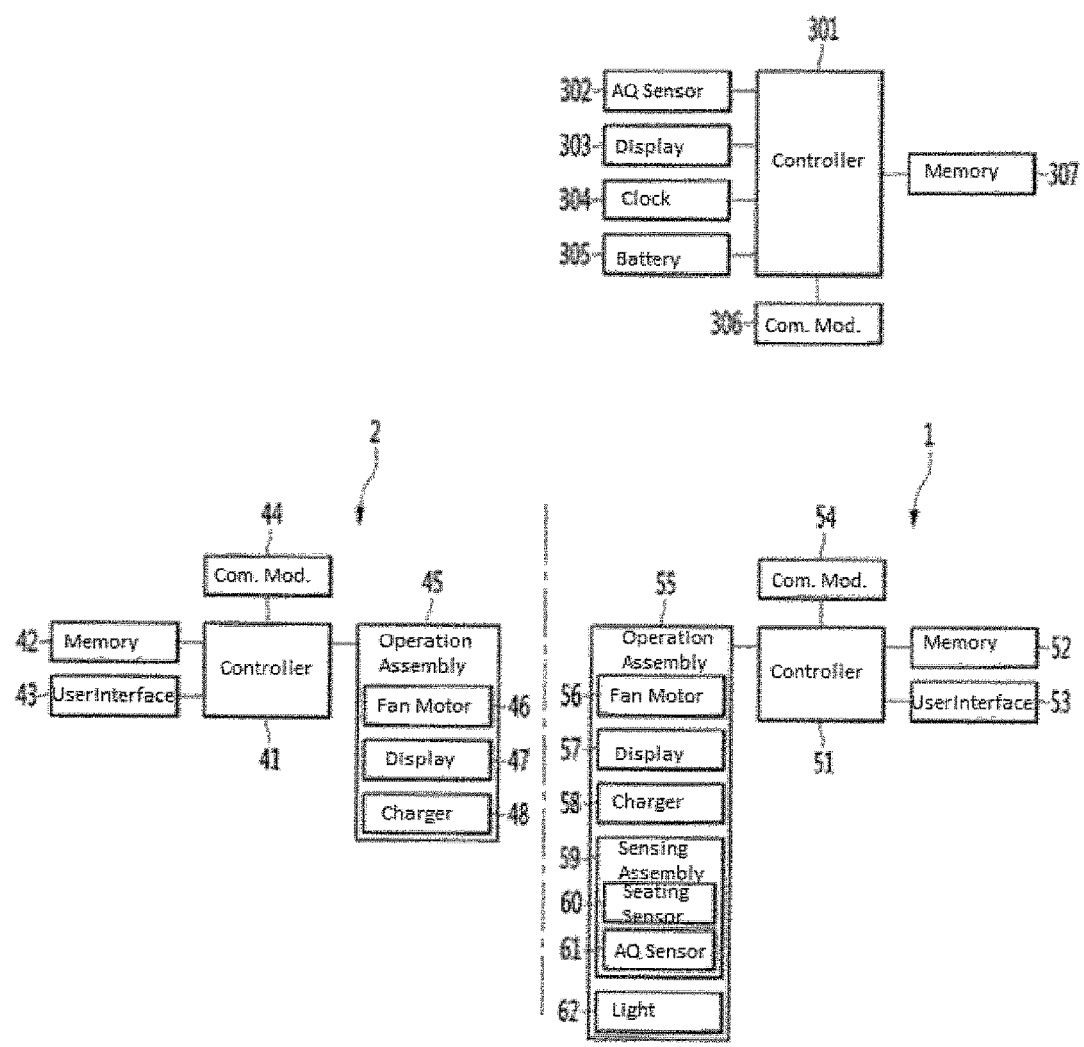
FIG. 15 is a block diagram of an air purifying system according to an embodiment.

FIG. 15 is similar to the block diagram of FIG. 7 except that FIG. 15 also includes the fixed and portable IOT devices. A description of the components described with reference to FIG. 7 may be omitted to avoid repetition.

Referring to FIG. 15, the main air purifier 1 may be provided with a controller 51, an operation assembly 55, a memory 52, a communication module 54, and a user interface 53. The operation assembly 55 may include a display 57, a fan driving device 56, a charging device 58, a sensing assembly 59, and a light device 62. The sensing assembly 59 may include a seating sensor 60 and an air quality or dust sensor 61.

The handheld air purifier 2 may be provided with a controller 41, an operation assembly 45, a memory 42, a communication module 44, and a user interface 43. The operation assembly 45 may include a fan driving device 46, a display 47, and a charging device 48. The operation assembly 45 may optionally include an air quality sensor and a light device.

The IOT devices 202 and 203 may each be provided with a controller 301 to control the IOT device 202 or 203, an air quality or dust sensor 302 ("AQ Sensor in FIG. 15") to measure air quality or a pollution degree, a display 303 to display information necessary for the user, a timer or clock 304 that can be turned on, and a battery 305 that supplies power to the IOT device 202 or 203. The IOT devices 202 and 203 may optionally include a user interface (e.g., a button or touch screen implemented on the display 303). As another option, the IOT devices 202 and 203 may include location or position trackers or sensors, such as a global positioning system (GPS), or alternatively may acquire location data from other devices (e.g., a user's smartphone).

Each IOT device 202 and 203 may further include a memory 307 to store information necessary for operation and a communication module 306 ("Com. Mod." in FIG. 15). The communication module 306 may be similar to the communication modules 44 and 54 of the handheld and main air purifiers 2 and 1, respectively. The communication module 306 may wirelessly communicate with the communication modules 44 and 54 of the handheld and main air purifiers 2 and 1, and may optionally be able to communicate with a network or server to transmit information to, e.g., a mobile or web application. The communication modules 44 and/or 54 may be able to estimate how close the portable IOT device 203 is from the air purifying system and/or determine whether the portable IOT device 203 is within a predetermined distance range.

The IOT devices 202 and 203 are shown as being used in an air purifying system, but are not limited thereto. The IOT devices 202 and 203 could optionally be used as standalone air quality sensors so that users may estimate how dirty their clothes are. The IOT devices 202 and 203 may also be used in conjunction with a single air purifier instead of the described air purifying system having the main air purifier 1 and handheld air purifier 2. Two or more users residing in the same indoor space where the main air purifier 1 is installed may use their own IOT device. Each user may possess his own IOT device identified by unique code.

The communication device 306 may be connected to an outside (i.e., external information) through various methods such as Wi-Fi, short-range communication, BlueTooth, and wired connection. Once connected, information stored in the memory 307 or information sensed by the air quality sensor 302 may be transmitted.

As an example, the communication device 306 may transmit information to an air purifying system via communication modules 44 and 54. Here, the air purifier system refers to both the main air purifier 1 and the handheld air purifier 2. The controllers 51 and 41 may change control of the operation assemblies 55 and 45 based on information transmitted from the communication device 306.

The IOT devices 202 and 203 may measure air quality corresponding to a specific time using the timer 204, and may sort the air quality information using time stamps. Measurements may be continuously performed at regular time intervals, or alternatively, air quality may be continuously measured by continuously measuring changes in the air quality for a predetermined period of time. In either case, air quality information correspond to a specific time and may be matched with the specific time. This information may be referred to as time-air quality information.

The acquired time-air quality information may be transmitted to an outside (e.g., the air purifying system, a mobile or web application, a smart home system, or another home system) through the communication device 306. When time-air quality information is transmitted to the air purifying system, the air purifying system may better estimate an amount of foreign matter adhered to clothing worn by a user carrying a portable IOT device 203 and/or may better estimate an amount of fine dust from outside scattering indoors based on information from a fixed IOT device 202 outside.

For example, if a user was travelling through a heavily air polluted area for even a short amount of time (or alternatively was travelling through a lightly polluted or moderately polluted area for a long or medium amount of time), the air purifying system, via any one of the displays 47, 57 303, may display a recommendation or prompt to use the handheld air purifier 2 to treat clothes. Alternatively or in addition thereto, the air purifying system may automatically turn on the main air purifier 1 upon receiving the information, which may be when a user returns home and the communication module 306 connects to a same WiFi or BlueTooth network that the communication modules 44 and 54 are connected to, or may be before the user returns home via different WiFi networks. In the latter case, the main air purifier 1 may use time data or location data to predict or determine when the user returns home, and may operate the main air purifier 1 at a time to best prepare for purifying the indoor space.

Figure 16:
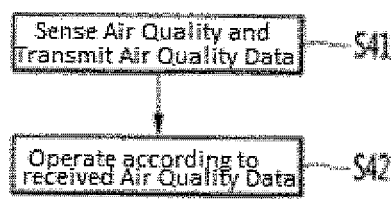
FIG. 16 is a flowchart illustrating a control method of an air purifying system according to another embodiment.

Referring to FIG. 16, the IOT devices 202 and 203 may sense or measure air quality of ambient air and transmit air quality information (or alternatively time-air quality information) to the air purifying system (S41). The air purifying system may automatically operate the main air purifier 1 when the outdoor air quality equals or exceeds a predetermined pollution level (S42).

Outdoor air may flow inside after a certain period of time even if all external doors are kept closed. Accordingly, in the case where the outdoor air quality is very bad (i.e., a pollution or contamination level is very high), indoor air may be kept clean by automatically operating the main air purifier 1 without a command or prompt from the user. Even when the user does not recognize how bad outside air is, the air purifying system may automatically operate and indoor air may be kept clean.

The fixed IOT device 202 may be installed outside and adjacent to an indoor space where the air purifying system is installed. The outdoor air of the environment where the IOT is placed may directly affect the indoor space where the air purifying system is located. However, information from a portable IOT device 203 may be used as well, as the portable IOT device 203 also measures outdoor air quality.

Figure 17:
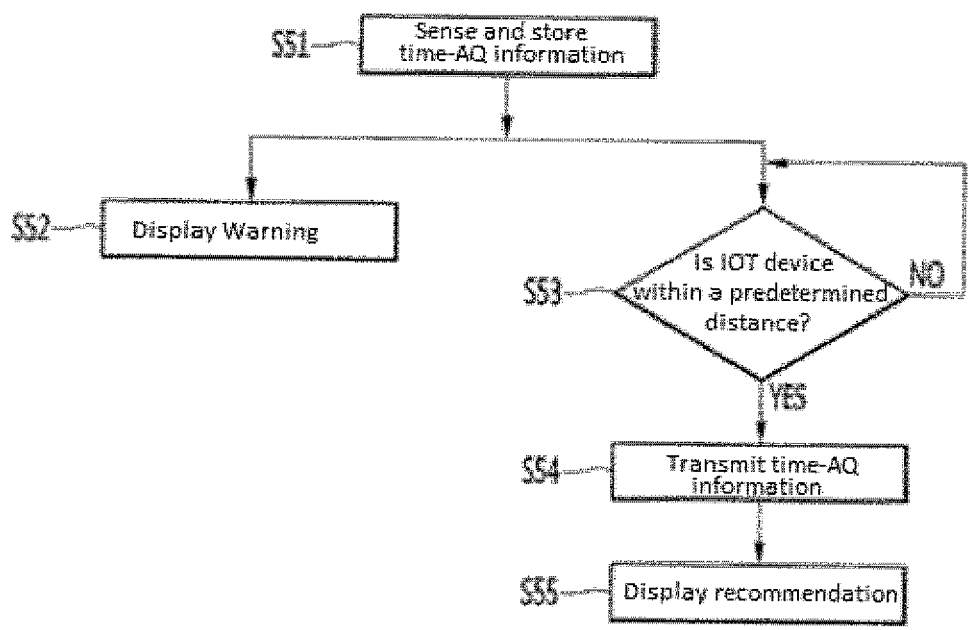
FIG. 17 is a flowchart illustrating a control method of an air purifying system according to another embodiment.

Referring to FIG. 17, the IOT devices 202 and 203 may sense and store air quality information and/or time-air quality information ("time-AQ information") about locations where the fixed and portable IOT devices 202 and 203 are placed (S51). The IOT devices 202 and 203 may also record time information to produce time-air quality information. If a current air quality indicates a pollution level at or above a predetermined pollution level, any one of the displays 303, 57, or 47 may display a warning for the user to wear a mask (S52). As an alternative, the air purifying system and/or the IOT devices 202 and 203 may include a speaker, and an alarm may sound warning the user to wear a mask.

The main air purifier 1 may periodically sense or determine whether the IOT devices 202 and 203 are within a predetermined distance range (S53). Such a determination may be based on location data or signals transmitted among the communication modules 306 and 54. If the IOT devices 202 and 203 are not within the predetermined distance range ("Not"), the main air purifier 1 may continue to operate (e.g., in a standby state) and periodically determine whether the IOT devices 202 and 203 are within the predetermined distance range. If the IOT devices 202 and 203 are within the predetermined distance range ("Yes"), time-air quality information may be transmitted to and received by the air purifying system via the communication modules 306, 44, and 54 (S54).

When the time-air quality information is transmitted, the main air purifier 1 and/or the handheld air purifier 2 may judge or estimate, by controllers 51 or 41, whether an amount of dust or foreign matter adhered to clothes worn by a user wearing the portable IOT device 203 is at or above a predetermined dust amount. If the dust amount is at or above the predetermined dust amount, any one of the displays 303, 47, and 57 may display a message recommending that the user treat his clothes with the handheld air purifier (S55). Alternatively or in addition thereto, the main air purifier 1 may be operated if the dust amount is at or above a second predetermined dust amount. Otherwise, the main air purifier 1 may operate according to the control methods as described in FIGS. 8-10.

The estimated dust amount may be a factor of both time and the air quality level sensed through (if continuous) or at each (if periodic) time. As an example, when graphing air quality level over time, a dust amount may be proportionate to an integral of the charted line or curve (i.e., the area under the curve).

Even if the user does not know air quality information of his residential space, the air purifier system may operate automatically in response to ambient air quality and make recommendations for a user to treat his clothes, and a user may conveniently maintain a clean life. The above-mentioned control method can be said to be the same even when two or more users use their own respective air quality sensor IOT devices, improving satisfaction.

This application is related to co-pending U.S. application Ser. No. 16/821,124 filed on Mar. 17, 2020 and Ser. No. 16/821,197 filed on Mar. 17, 2020, the entire contents of which are hereby incorporated by reference.

Embodiments disclosed herein may be implemented as an air cleaning or purifying system provided with a main air cleaner or purifier maintained at a fixed position and a movable or handheld air cleaner or purifier which is freely attachable to the main air cleaner to be applied to clothes without restraint. Not only can the two air purifiers be used individually, but dust cleaning of clothes may be performed with greater efficiency by mutual cooperation of the two purifiers, which may be advantageous for industrial application. A clean living area or work area may be carried out by air purifier(s) responding to a current outdoor air quality and/or to an estimated amount of dust accumulated on the user.

Embodiments disclosed herein may provide an air cleaning or purifying system and an air cleaning, filtering, or purifying system control method which may prevent scattering of dust removed from clothing and reduce indoor pollution. Embodiments disclosed herein may reduce a likelihood that dust will enter a user's mouth when the user removes foreign matter from clothes.

Embodiments disclosed herein may provide an air cleaning or purifying system and an air cleaning or purifying system control method capable of reducing energy consumption. Embodiments disclosed herein may operate according to air quality of outside air to keep an indoor space clean.

Embodiments disclosed herein may be implemented as an air purifying system including a main air cleaner or purifier placed in an indoor space to perform air cleaning or purifying and a portable air quality sensor internet of things (IOT) device that communicates with the main air cleaner. The IOT device may be placed in an outdoor space adjacent to an indoor space to measure air quality of outdoor air. The main air cleaner may be controlled according to outdoor air quality information to maintain air quality of the indoor space, which may be influenced by outdoor air quality even if doors and windows are closed.

When the IOT device indicates that the air quality of the outdoor space is bad, the main air cleaner may be automatically operated (e.g., a fan speed may be increased) so that the user does not have to constantly control the main air cleaner.

The IOT device may include a timer or clock. The IOT device may record, store, and provide air quality data accumulated periodically. The IOT device may use accumulated air quality data to estimate or predict future air quality information and/or an amount of dust or foreign matter accumulated on a person travelling outside. The main air cleaner may be operated accordingly to address the predicted air quality and/or to remove the dust accumulated on the person after returning home. The IOT device may optionally acquire and store location data of a person to estimate their return home.

A portable or handheld air cleaner or purifier may be provided and may be easily mounted on and separated from the main air cleaner. The portable air cleaner may have a smaller cleaning capacity than the main air cleaner. The portable air cleaner may also be referred to as a moving body air cleaner or purifier, a dust vacuum, or a moveable air purifier. The portable air cleaner may suction dust from clothes.

At least one of the main air cleaner and the portable air cleaner may have a fan and a filter therein to ensure cleanliness of a living environment. A seat or mounting sensor may be provided to sense when the portable air cleaner is seated or mounted on the main air cleaner. The user may conveniently use the air cleaning system through interlocking of the portable air cleaner and the main air cleaner.

The portable air cleaner may be seated on a mounting portion or recess formed on an outer surface of the main air cleaner at a position that may be easily recognized, viewed, and or grabbed by a user. The portable air cleaner may be oriented such that a longitudinal direction extends vertically or up and down on the outer surface of the main air cleaner. The portable air cleaner may be placed in a narrow angle range of the main air cleaner, which may have a cylinder shape. The portable air cleaner may have a handle that extends upward and/or outward so that the user may easily grasp the handle to use the portable air cleaner.

The outer surface of the main air cleaner may be recessed to form the mounting portion, and a front end or face of the portable air cleaner may hang and/or contact a bottom of the mounting portion so that the main air purifier may support the portable air purifier. A magnetic coupling set (i.e., a pair of magnets or a magnet and a metal) or other coupling mechanism may be optionally provided on the main and portable air purifiers to firmly maintain a mounting of the portable air cleaner on the main air cleaner.

The IOT device may be portable, and the user may carry the IOT device. The IOT device may communicate with the main air cleaner and/or the portable air cleaner. The IOT device may measure air quality at a location where the user is carrying the IOT device. The IOT device may optionally measure position information relative to the main air cleaner. Based on accumulated air quality and/or position data by the IOT device, a controller may determine an amount of dust acquired on clothes worn by the user. The IOT device may display a recommendation to the user to use the portable air cleaner based on the determined amount of dust acquired on the clothes.

The IOT device may also be installed in an outdoor space adjacent to the indoor space to measure the air quality of the outdoor space. Based on accumulated air quality data, the main air cleaner may automatically operate to correspond to a degree of air quality and/or estimated amounts of fine dusts flowing into the indoor space from the outdoor space. An indoor space can be more efficiently cleaned. Even if the user goes outside without operating or controlling the main air cleaner, the main air cleaner may automatically operate so that the user returns home to a clean atmosphere.

A plurality of IOT devices may be provided. For example, each member of a household may carry an IOT device, and in addition, an IOT device may be optionally installed in an outdoor space adjacent to an indoor space of the household. The main air cleaner may operate in accordance with a number of people living in the same indoor space. Each user carrying an IOT device may receive a personalized recommendation on whether to use the portable air cleaner based on air quality data measured by the particular IOT device corresponding to the user. The IOT device(s) may wirelessly communicate with the main air cleaner, which may operate according to measured outdoor air quality by the IOT device(s) and optionally based on position or location data. Alternatively or in addition thereto, the IOT device may implement Near Field Communication (NFC) technology with the main air cleaner, and the main air cleaner may operate according to air quality information measured when the IOT device is near the main air cleaner. Alternatively or in addition thereto, the IOT device may be able to estimate whether the main air purifier is operating based on a changed in sensed air quality and based on location data. If the IOT device is located near the main air purifier and the air quality has improved in a short amount of time, the IOT device may determine that the main air purifier is operating. As another alternative, the IOT device may be able to determine how effective the main air purifier is at purifying indoor air, and may recommend to a user when to replace the filter in the main air purifier based on decreased performance. For example, if, after a month, the IOT device detects that air quality of the indoor space is improving at a slower rate, the IOT device may display a warning to the user to replace the filter of the main air purifier.

Embodiments disclosed herein may be implemented as a control method of an air cleaning system. An air quality sensor IOT device may include an air quality sensor to measure air quality of an outdoor space and a communication module to transmit the measured air quality to a main air cleaner or purifier provided in an adjacent indoor space. The main air cleaner may be automatically activated when the outdoor air quality is bad or measured to be above a predetermined pollution level by the IOT device. The user may enjoy clean indoor air even if he or she does not realize that an operation of the main air cleaner needs to be modified to address bad outdoor air quality.

The air quality sensor may be an independent device and may be incorporated in the IOT device. The IOT device may be an inexpensive small-sized device, and another device or sensor may not be required to effectively implement the air cleaning system. The IOT device may be fixedly installed in an outdoor space adjacent to the indoor space so that the air cleaner may address residual or predicts effects of the outdoor air quality on the indoor air quality.

Embodiments disclosed herein may be implemented as a method of controlling an air cleaning system comprising measuring an air quality and time via an IOT device and storing the measured time and air quality as time-air quality information. The method may further comprising transmitting the time-air quality information from the IOT device to a main air cleaner and controlling the main air purifier based on the time-air quality information. The method may further comprising displaying a recommendation to use a portable air cleaner based on the time-air quality information.

The IOT device may be provided as a separate independent device that the user carries and moves. An amount of foreign matter such as fine dust deposited on the clothes may be accurately estimated and/or determined.

The air cleaning system may include at least one of a main air cleaner or purifier and a portable air cleaner or purifier attached to the main air cleaner. When the IOT device is close to at least one of the main air cleaner or the portable air cleaner, the IOT device may transmit time-air quality information, and the main air cleaner may be controlled accordingly and/or at least one of the main air cleaner or the IOT device may make a recommendation to the user to use the portable air cleaner so that the user may conveniently use the air cleaning system.

The air cleaning system may provide a recommendation to use of the air cleaning system to correspond to foreign matter such as fine dust deposited on clothes and/or may provide a recommendation to remove foreign matter from clothes.

Embodiments disclosed herein may reduce dust scattering into a room during dust removal of the clothes by suctioning the dust. Since dust on clothes may be removed by a suction method implemented by a portable or movable air cleaner, an amount of foreign matter unintentionally breathed in by the user may be reduced. The moveable air cleaner may be operated close to the main air cleaner, and any dust scattered in the air due to the moveable air cleaner may be suctioned by the main air cleaner, further reducing the likelihood of a user breathing in dust.

An operation of the moveable air cleaner and an operation of the main air cleaner may be synchronized so to improve convenience and reduce unnecessary energy use. Since the air cleaning system may be operated according to air quality of outside air, indoor air may be more clean to increase comfort of an indoor space.

Embodiments disclosed herein may be implemented as an air filtering system comprising a first air purifier having a fan to suction air and a filter to filter air, the first air purifier being provided at a first position, and a first sensor device to sense air quality at a second position remote from the first position, to store the sensed air quality, and to transmit data corresponding to the sensed air quality to the first air purifier. The first air purifier may be controlled using the data of the sensed air quality received from the first sensor device.

When the received data indicates a pollution level that is greater than a predetermined pollution level, the first air purifier may be automatically operated to perform at least one of turning on the fan or increasing a speed of the fan.

The first sensor device may include at least one of a timer or a clock to measure and specify time. The first sensor device may be configured to store time-air quality data.

A second air purifier may be configured to be seated on and removed from the first air purifier. The second air purifier may have a cubic feet per minute (CFM) value that is smaller than a CFM value of the first air purifier. The second air purifier may include a fan and a filter. A seat sensor may sense whether the second air purifier is seated on the first air purifier.

An outer surface of the first air purifier may include a recess configured to receive the second air purifier. The second air purifier may include a handle. A bottom of the recess may include a wall that is curved upward and outward away from an inner surface of the recess so as to form a pocket with the recess. The pocket may be configured to receive the handle.

The first sensor device may be configured to be carried by a user. The second position may be a position to which the user has carried the first sensor device.

The first position may be located in an indoor space. The second position may be located in an outdoor space outside of the indoor space. The first sensor device may be fixed at the second position.

A second sensor device may sense air quality at a third position remote from the first position, to store the sensed air quality, and to transmit data corresponding to the sensed air quality to the first air purifier. The first air purifier may be controlled using the data of the sensed air quality received from at least one of the first or second sensor devices.

Embodiments disclosed herein may be implemented as an air purifying system comprising an air purifier having a fan to suction air, the air purifier being provided in an indoor space and configured to purify indoor air, and a sensor to sense air quality of an outdoor space outside of the indoor space. The sensor may be configured to transmit data corresponding to the sensed air quality to the air purifier. The fan of the air purifier may be controlled based on the data of the sensed air quality received from the sensor.

The sensor may be included in an internet of things (IOT) device. The IOT device may be configured to be controlled separately from the air purifier. The IOT device may be configured to be installed and fixed at a position in the outdoor space. The IOT device may be configured to communicate wirelessly with the air purifier.

Embodiments disclosed herein may be implemented as an air purifying system comprising at least one air purifier provided in an indoor space, and an internet of things (IOT device) having an air quality sensor configured to sense air quality and time during a predetermined time period. The IOT device may be configured to store the sensed air quality and time as time-air quality data, transmit the stored time-air quality data to the air purifier, and estimate at least one of a total amount of dust present on a user carrying the IOT device or whether the air purifier has operated during the predetermined time period.

The at least one air purifier may include a main air purifier and a handheld air purifier configured to suction dust and attached to the main air purifier. At least one of the main air purifier, handheld air purifier, or IOT device may include a position sensor to measure a position of the IOT device relative to the main air purifier. When a position of the IOT device is within a predetermined distance range, the time-air quality data may be transmitted from the IOT device to the main air purifier.

When the estimated amount of dust exceeds a predetermined dust amount, at least one of the IOT device, the main air purifier, or the handheld air purifier may display a recommendation for the user to use the handheld air purifier.

Embodiments disclosed herein may be implemented as an air purifying system comprising a main air purifier, a cleaner having a motor to suction air and a filter to filter dust from the suctioned air, the cleaner being one of a secondary air purifier and a vacuum cleaner, and a portable air quality sensor device. The portable air quality sensor device may include a case, an air quality sensor to sense a pollution level of ambient air, an output device configured to output at least one of text, image, or a sound based on a sensed pollution level, a timer or clock to store time data corresponding to the sensed pollution level, a controller to estimate total amount of dust exposed to the IOT device based on the pollution level and time data, and a communication module to transmit at least one of the sensed pollution level, the time data, or the estimated total amount of dust to the main air purifier.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air filtering system, comprising:
  a first air purifier having a fan to suction air and a filter to filter air, the first air purifier being placed at a first position; and
  a first sensor device to sense air quality at a second position remote from the first position where the first air purifier placed at, to store the sensed air quality, and to transmit data corresponding to the sensed air quality to the first air purifier, wherein the first air purifier is controlled using the data of the sensed air quality received from the first sensor device.

2. The air filtering system of claim 1, wherein, when the received data indicates a pollution level that is greater than a predetermined pollution level, the first air purifier is automatically operated to perform at least one of turning on the fan or increasing a speed of the fan.

3. The air filtering system of claim 1, wherein the first sensor device includes at least one of a timer or a clock to measure and specify time, and the first sensor device is configured to store time-air quality data.

4. The air filtering system of claim 1, further comprising a second air purifier configured to be seated on and removed from the first air purifier, the second air purifier having a cubic feet per minute (CFM) value that is smaller than a CFM value of the first air purifier.

5. The air filtering system of claim 4, wherein the second air purifier includes a fan and a filter.

6. The air filtering system of claim 4, further comprising a seat sensor to sense whether the second air purifier is seated on the first air purifier.

7. The air filtering system of claim 4, wherein an outer surface of the first air purifier includes a recess configured to receive the second air purifier.

8. The air filtering system of claim 7, wherein the second air purifier includes a handle, and a bottom of the recess includes a wall that is curved upward and outward away from an inner surface of the recess so as to form a pocket with the recess, the pocket being configured to receive the handle.

9. The air filtering system of claim 1, wherein the first sensor device is configured to be carried by a user, and the second position is a position to which the user has carried the first sensor device.

10. The air filtering system of claim 1, wherein the first position is located in an indoor space, the second position is located in an outdoor space outside of the indoor space, and the first sensor device is fixed at the second position.

11. The air filtering system of claim 1, further comprising a second sensor device to sense air quality at a third position remote from the first position where the first air purifier placed at, to store the sensed air quality, and to transmit data corresponding to the sensed air quality to the first air purifier, wherein the first air purifier is controlled using the data of the sensed air quality received from at least one of the first or second sensor devices.

12. An air purifying system, comprising:
an air purifier having a fan to suction air, the air purifier being placed in an indoor space and configured to purify indoor air, and
a sensor to sense air quality of an outdoor space outside of the indoor space and remote from the indoor space where the air purifier placed in, the sensor being configured to transmit data corresponding to the sensed air quality to the air purifier, wherein the fan of the air purifier is controlled based on the data of the sensed air quality received from the sensor.

13. The air purifying system of claim 12, wherein the sensor is included in an internet of things (IOT) device, the IOT device being configured to be controlled separately from the air purifier.

14. The air purifying system of claim 13, wherein the IOT device is configured to be installed and fixed at a position in the outdoor space.

15. The air purifying system of claim 14, wherein the IOT device is configured to communicate wirelessly with the air purifier.

16. An air purifying system, comprising:
at least one air purifier placed in an indoor space; and
an internet of things (IOT) device having an air quality sensor configured to sense air quality and time during a predetermined time period, the IOT device being configured to store the sensed air quality of an outdoor space remote from the indoor space where the air purifier placed in and time as time-air quality data, transmit the stored time-air quality data to the air purifier, and estimate at least one of a total amount of dust present on a user carrying the IOT device or whether the air purifier has operated during the predetermined time period.

17. The air purifying system of claim 16, wherein the at least one air purifier includes a main air purifier and a handheld air purifier configured to suction dust and attached to the main air purifier, wherein at least one of the main air purifier, the handheld air purifier, or the IOT device includes a position sensor to measure a position of the IOT device relative to the main air purifier, and wherein, when a position of the IOT device is within a predetermined distance range, the time-air quality data is transmitted from the IOT device to the main air purifier.

18. The air purifying system of claim 17, wherein, when the estimated amount of dust exceeds a predetermined dust amount, at least one of the IOT device, the main air purifier, or the handheld air purifier displays a recommendation for the user to use the handheld air purifier.

19. An air purifying system, comprising:
a main air purifier in an indoor space;
a cleaner having a motor to suction air and a filter to filter dust from the suctioned air, the cleaner being one of a secondary air purifier and a vacuum cleaner; and
a portable air quality sensor device, including:
a case;
an air quality sensor to sense a pollution level of ambient air;
an output device configured to output at least one of text, image, or a sound based on a sensed pollution level;
a timer or a clock to store time data corresponding to the sensed pollution level;
a controller to estimate total amount of dust exposed to the IOT device based on the pollution level and time data; and
a communication module to transmit at least one of the sensed pollution level, the time data, or the estimated total amount of dust to the main air purifier,
wherein the portable air quality sensor device is configured to sense a pollution level of ambient air which is remote from the indoor space where the main air purifier placed at.

* * * * *